United States Patent
Watanabe

(10) Patent No.: US 10,984,555 B2
(45) Date of Patent: Apr. 20, 2021

(54) OBJECT DETECTION DEVICE AND VEHICLE

(71) Applicant: MITSUBISHI ELECTRIC CORPORATION, Chiyoda-ku (JP)

(72) Inventor: Shintaro Watanabe, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/486,529

(22) PCT Filed: Mar. 30, 2017

(86) PCT No.: PCT/JP2017/013402
§ 371 (c)(1),
(2) Date: Aug. 16, 2019

(87) PCT Pub. No.: WO2018/179281
PCT Pub. Date: Oct. 4, 2018

(65) Prior Publication Data
US 2020/0051282 A1    Feb. 13, 2020

(51) Int. Cl.
*G06T 7/80*    (2017.01)
*G06T 7/593*    (2017.01)
(Continued)

(52) U.S. Cl.
CPC ............ *G06T 7/85* (2017.01); *G06K 9/00798* (2013.01); *G06T 7/20* (2013.01); *G06T 7/536* (2017.01);
(Continued)

(58) Field of Classification Search
None
See application file for complete search history.

(56) References Cited

U.S. PATENT DOCUMENTS

2011/0311130 A1* 12/2011 Ichimori ................. G06T 7/593
382/154
2012/0236125 A1* 9/2012 Umezawa ................. G01C 3/14
348/47
(Continued)

FOREIGN PATENT DOCUMENTS

JP    2005-217883 A    8/2005
JP    2009-182879 A    8/2009
(Continued)

OTHER PUBLICATIONS

International Search Report dated Jun. 27, 2017 in PCT/JP2017/013402 filed on Mar. 30, 2017.
(Continued)

*Primary Examiner* — Hung Q Dang
(74) *Attorney, Agent, or Firm* — Xsensus LLP

(57) ABSTRACT

An object detection device, detecting an object based on an image from a stereo camera on a vehicle, includes a parallax calculator, a first road parameter estimator, a road parameter storage, a second road parameter estimator, and an object detector. The parallax calculator calculates three-dimensional information of a scene in the image. The first road parameter estimator calculates a first road parameter based on the three-dimensional information. The road parameter storage associates the first road parameter with vehicle information to store therein. The second road parameter estimator calculates, based on stored information, a second road parameter using the first road parameter under a predetermined condition for the vehicle. The object detector detects the object using the second road parameter. The predetermined condition includes that an angular difference between a road surface observed from the stereo camera and a contact surface of the vehicle at observation is within a predetermined angle.

15 Claims, 17 Drawing Sheets

(51) Int. Cl.
- *G06T 7/536* (2017.01)
- *G06T 7/70* (2017.01)
- *H04N 13/246* (2018.01)
- *H04N 13/239* (2018.01)
- *G06K 9/00* (2006.01)
- *G06T 7/20* (2017.01)
- *H04N 13/00* (2018.01)

(52) U.S. Cl.
CPC ............... *G06T 7/593* (2017.01); *G06T 7/70* (2017.01); *H04N 13/239* (2018.05); *H04N 13/246* (2018.05); *G06T 2207/10012* (2013.01); *G06T 2207/30244* (2013.01); *G06T 2207/30256* (2013.01); *H04N 2013/0081* (2013.01)

(56) References Cited

U.S. PATENT DOCUMENTS

| | | |
|---|---|---|
| 2015/0279017 A1 | 10/2015 | Tamura et al. |
| 2017/0262734 A1* | 9/2017 | Nakata ............... G06K 9/00979 |
| 2018/0285660 A1* | 10/2018 | Ohara ............... G06K 9/00798 |
| 2018/0365859 A1* | 12/2018 | Oba ..................... B60W 40/114 |

FOREIGN PATENT DOCUMENTS

| | | |
|---|---|---|
| JP | 2013-195783 A | 9/2013 |
| JP | 2015-190921 A | 11/2015 |

OTHER PUBLICATIONS

Zhang, Z., "A Flexible New Technique for Camera Calibration," IEEE Transactions on Pattern Analysis and Machine Intelligence, 22(11):1330-1334, 2000 (Total 22 pages).

Jyo, G. et al., "3D Vision," Kyoritsu Shuppan Co., Ltd., 1998, pp. 79-94 (with English translation, Total 38 pages).

Comaniciu, D. et al., "Mean Shift: A Robust Approach Toward Feature Space Analysis," IEEE Transactions on Pattern Analysis and Machine Intelligence, vol. 24, No. 5, May 2002, pp. 603-619.

Duda, R. et al., "Use of the Hough Transformation to Detect Lines and Curves in Pictures," Communications of the ACM, vol. 15, No. 1, Jan. 1972, pp. 11-15.

\* cited by examiner

BEFORE PARALLELIZATION

AFTER PARALLELIZATION $H=H_0$ $H>H_0$ $H<H_0$

OBJECT DETECTION DEVICE AND VEHICLE

TECHNICAL FIELD

The present invention relates to an object detection device that detects an object such as an obstacle using a stereo camera mounted on a mobile body such as a vehicle, and relates to a vehicle.

BACKGROUND ART

In order to accurately obtain three-dimensional information such as depth in a scene around a vehicle using a stereo camera on the vehicle, it is necessary to accurately grasp the positional relationship of the installed stereo camera. Such positional relationship is gradually shifted due to vibration caused by traveling of the vehicle, looseness caused by aging, and the like, and therefore, a technique has been proposed for automatically performing calibration for positional shift of a stereo camera (for example, Patent Document 1).

Patent Document 1 discloses a calibration method for performing calibration of camera parameters of a stereo camera based on an optical flow. In Patent Document 1, using a stereo camera while a vehicle or the like travels, the inclination angle in the pitch direction of the road surface with respect to a camera is obtained as a parameter, and the movement amount between frames for points on the road surface, that is, the optical flow is obtained. In Patent Document 1, calibration of the stereo camera is performed by calculating the deviation of the parallax offset generated in the stereo camera based on the relationship between each amount obtained and the movement amount of the vehicle between frames.

PRIOR ART DOCUMENTS

Patent Documents

Patent Document 1: JP 2009-182879 A

Non-Patent Documents

Non-Patent Document 1: "A flexible new technique for camera calibration", IEEE Transactions on Pattern Analysis and Machine Intelligence, 22 (11): 1330-1334, 2000

Non-Patent Document 2: Gang Xu (Jo Go), "3D Vision" Kyoritsu Publishing, 1998

Non-Patent Document 3: "Mean shift: A robust approach towards feature space analysis", IEEE Trans. On PAMI, 2002

Non-Patent Document 4: "Use of the Hough Transformation to Detect Lines and Curves in Pictures", Comm. ACM, Vol. 15, pp. 11-15

SUMMARY OF THE INVENTION

Problems to be Solved by the Invention

An object of the present invention is to provide an object detection device using a stereo camera mounted on a vehicle, the object detection device capable of accurately performing calibration for positional shift of the stereo camera.

Means for Solving the Problems

An object detection device according to the present invention detects an object based on an image obtained from a stereo camera on a vehicle. The object detection device includes a parallax calculator, a first road parameter estimator, a road parameter storage, a second road parameter estimator, and an object detector. The parallax calculator calculates three-dimensional information of a scene in the image. Based on the three-dimensional information, the first road parameter estimator calculates a first road parameter indicating a distance between the stereo camera and the road surface on which the vehicle is traveling. The road parameter storage associates the first road parameter with the vehicle information related to the traveling state of the vehicle successively to store first road parameters and vehicle information therein. Based on the vehicle information and the first road parameter stored in the road parameter storage, the second road parameter estimator calculates a second road parameter using the first road parameter under a predetermined condition regarding the vehicle. The object detector detects an object using the second road parameter. The predetermined condition includes a condition that the angular difference between the road surface observed from the stereo camera and a contact surface of the vehicle at the time of observation is within a predetermined angle.

Effects of the Invention

According to the object detection device of the present invention, the second road parameter is calculated using the first road parameter calculated under the predetermined condition of the traveling state of the vehicle. With this, calibration with respect to the positional shift of the stereo camera mounted in the vehicle can be performed accurately.

EMBODIMENTS OF THE INVENTION

Figure 1:
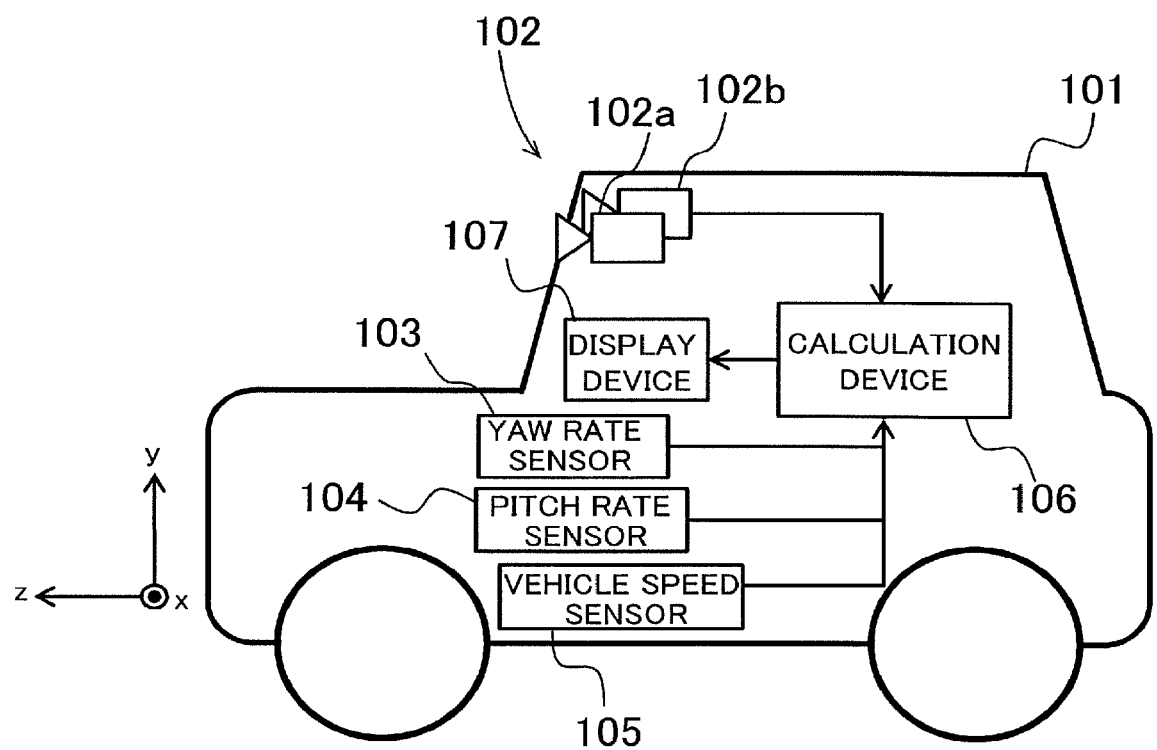
FIG. 1 is a diagram showing an overall configuration of a vehicle according to a first embodiment.

Hereinafter, embodiments of the present invention will be described in detail with reference to the drawings. Note that, components designated by the same reference numerals are the same or equivalent components, which are common throughout the specification.

(Inventor's Consideration)

Prior to the description of specific embodiments of the present invention, the present inventor's consideration for an object detection device using a stereo camera will be described below.

Three-dimensional information including the depth of a scene obtained from a stereo camera is obtained based on camera internal parameters such as distortion and focal length of each camera constituting the stereo camera and camera external parameters indicating a positional relationship between two cameras. For this reason, when a vehicle on which the stereo camera is mounted is shipped, the parameters are measured by shooting with two cameras on which a pattern of a known shape and size is mounted.

However, among the parameters, in particular, the camera external parameters are gradually shifted by vibration caused by traveling or looseness caused by aging. When such positional shift occurs, the depth of the scene cannot be obtained correctly, and therefore, a technique to automatically calibrate the camera external parameters in the stereo camera is required.

The camera external parameters are represented by a translation vector and a rotation matrix described later, and calibration of the camera external parameters can be divided into two processes, i.e., a first process of obtaining the direction of the translation vector and the rotation matrix and a second process of obtaining the length, namely, scale of the translation vector. The first process can be performed by obtaining a plurality of pairs of points at which the same object appears between images shot by each camera. On the other hand, in the second process, a specific object whose scale can be grasped in the scene is used as a reference, and such a scale reference needs to be set appropriately. The inventor of the present application has intensively studied about a method of accurately performing the second process.

The inventor of the present application examined the problems of the prior art as follows. In the prior example of Patent Document 1 and the like, the three-dimensional information of the road surface is obtained from the stereo camera and the three-dimensional information of the road surface is obtained by association between before and after movement between frames of one camera (so-called motion stereo), and the former stereo camera is calibrated using the three-dimensional information obtained by the latter as the scale standard.

The accuracy of the three-dimensional information of the road surface obtained by the motion stereo as described above depends on the accuracy of the movement amount of the camera between the frames. In the prior example, the movement amount of the camera is calculated from the information of the vehicle speed. Generally, the vehicle speed of a vehicle is obtained from a vehicle speed pulse generated in synchronization with the rotation of the wheel. However, it is considered that it is difficult to obtain the vehicle speed with sufficient accuracy from this mechanism as follows.

That is, an on-vehicle stereo camera is normally configured to have an inter-camera distance of some dozen to several tens of centimeters, and the shift amount caused by aging of the stereo camera is estimated to be several millimeters or less at most. In order to correct this shift amount on the basis of motion stereo, it is necessary to obtain the camera movement amount between frames with an error of 1% or less. However, in the mechanism based on the vehicle speed pulses as described above, it is considered to be extremely difficult to obtain the camera movement amount with such high accuracy.

Further, in stereo ranging using two cameras and in stereo ranging based on the movement amount of one camera, calculation of a three-dimensional position is based on the following measurement principle. That is, the calculation is based on the principle in which the three-dimensional position to be a target is obtained by obtaining the position of two viewpoints and the angles with respect to the target viewed from that viewpoints, assuming a straight line extending from each of the viewpoints in the angle of the target direction, and obtaining the intersection point between the assumed straight lines.

It is known that since an object on the straight line connecting the two viewpoints is based on the above principle, the straight line extending from each of the viewpoints in the angle of the target direction becomes an identical straight line, the intersection point cannot be identified, and the three-dimensional position is not obtained. Similarly, also in a region near the straight line connecting the two viewpoints, each of the straight lines extending from the two viewpoints in the angle of the target direction is almost parallel, and a slight error in the angle of the target direction will cause the intersection point to greatly shift. Therefore, it is indicated that such a region is a region where three-dimensional information is difficult to calculate with high accuracy.

Here, assuming that a vehicle with a camera facing forward moves forward on a straight road, the camera also moves forward as the vehicle moves forward. At this time, if a line connecting two viewpoints of the camera moved between the frames is extended, the line will overlap with the straight road ahead. As described above, in the principle of stereo ranging, it is difficult to accurately obtain three-dimensional information of a region close to the line connecting the two viewpoints. Therefore, it is considered that the three-dimensional information of the road surface obtained by the association between before and after movement between frames of one camera is difficult in principle to obtain with high accuracy.

For the two reasons described above, it is considered to be difficult to calibrate a stereo camera on a basis of three-dimensional information by motion stereo. As a result of intensive studies, the inventor of the present invention has devised an object detection device that automatically performs calibration by accurately obtaining a scale reference for correcting the distance between stereo cameras from the traveling scene of a vehicle. Hereinafter, specific embodiments of the object detection device according to the present invention will be described.

First Embodiment

An object detection device according to the first embodiment and a vehicle that includes the object detection device will be described below.

1. Configuration

The configurations of the object detection device and the vehicle according to the present embodiment will be described with reference to FIG. 1. FIG. 1 is a diagram showing the overall configuration of a vehicle 101 according to the present embodiment. In FIG. 1, the depth direction viewed from the vehicle 101 is denoted by a z direction, the vertical direction is denoted by a y direction, and the width direction of the vehicle 101 orthogonal to the z and y directions is denoted by an x direction. Also, the +x direction may be referred to as left, the −x direction as right, the +y direction as upper, the −y direction as lower, the +z direction as front, and the −z direction as rear.

The vehicle 101 is mounted with the object detection device according to the present embodiment. As shown in FIG. 1, the vehicle 101 includes a stereo camera 102, a yaw rate sensor 103, a pitch rate sensor 104, a vehicle speed sensor 105, a calculation device 106, and a display device 107. Each of the sensors 103, 104, and 105 is an example of a vehicle information detector that detects vehicle information related to the movement state of the vehicle 101.

The stereo camera 102 is configured of two cameras 102a and 102b. The two cameras 102a and 102b are disposed with their optical axes being parallel to each other as the left camera 102a and the right camera 102b aligned in the right-left direction (x direction) of the vehicle 101, for example. The two cameras 102a and 102b can shoot an image in synchronization with each other.

In this embodiment, the stereo camera 102 is installed near the front windshield of the vehicle 101 so that the road surface in front of the vehicle 101 can be shot by the left and right cameras 102a and 102b. However, the configuration of the stereo camera as described above is an example, and as long as the two cameras can share the field of view, they may not be parallel and may not face forward with respect to the vehicle.

The yaw rate sensor 103 is a sensor for detecting a rotation angular velocity (yaw rate) about the vertical axis (y axis) of the vehicle 101. The yaw rate sensor 103 is mounted on the vehicle 101 so as to be parallel to the y axis.

The pitch rate sensor 104 is a sensor for detecting a rotation angular velocity (pitch rate) about the axis in the right-left direction (x direction) of the vehicle 101. The pitch rate sensor 104 is mounted on the vehicle 101 so as to be parallel to the x axis.

The vehicle speed sensor 105 is a device that generates a pulse signal in proportion to the rotation speed of an axle of the vehicle 101, and can calculate the vehicle speed from the wheel diameter and the number of pulses.

The calculation device 106 is a device configured with a CPU, an RAM, an ROM, and the like. The calculation device 106 may further include an internal memory such as a flash memory. The CPU of the calculation device 106 reads data and programs stored in the ROM or the like into the RAM or the like, performs various calculation processing, and realizes various functions.

For example, the calculation device 106 receives an image signal from the stereo camera 102, a yaw rate signal from the yaw rate sensor 103, a pitch rate signal from the pitch rate sensor 104, and a vehicle speed signal from the vehicle speed sensor 105, and the calculation device 106 detects an object in front of the vehicle 101 by performing various image processing, and outputs object information of the detection result to the display device 107. The calculation device 106 is an example of the object detection device in the present embodiment. Details of the configuration for the calculation device 106 to function as an object detection device will be described later.

The display device 107 is configured of, for example, a liquid crystal display or an organic EL display. The display device 107 displays various information including object information from the calculation device 106.

Figure 2:
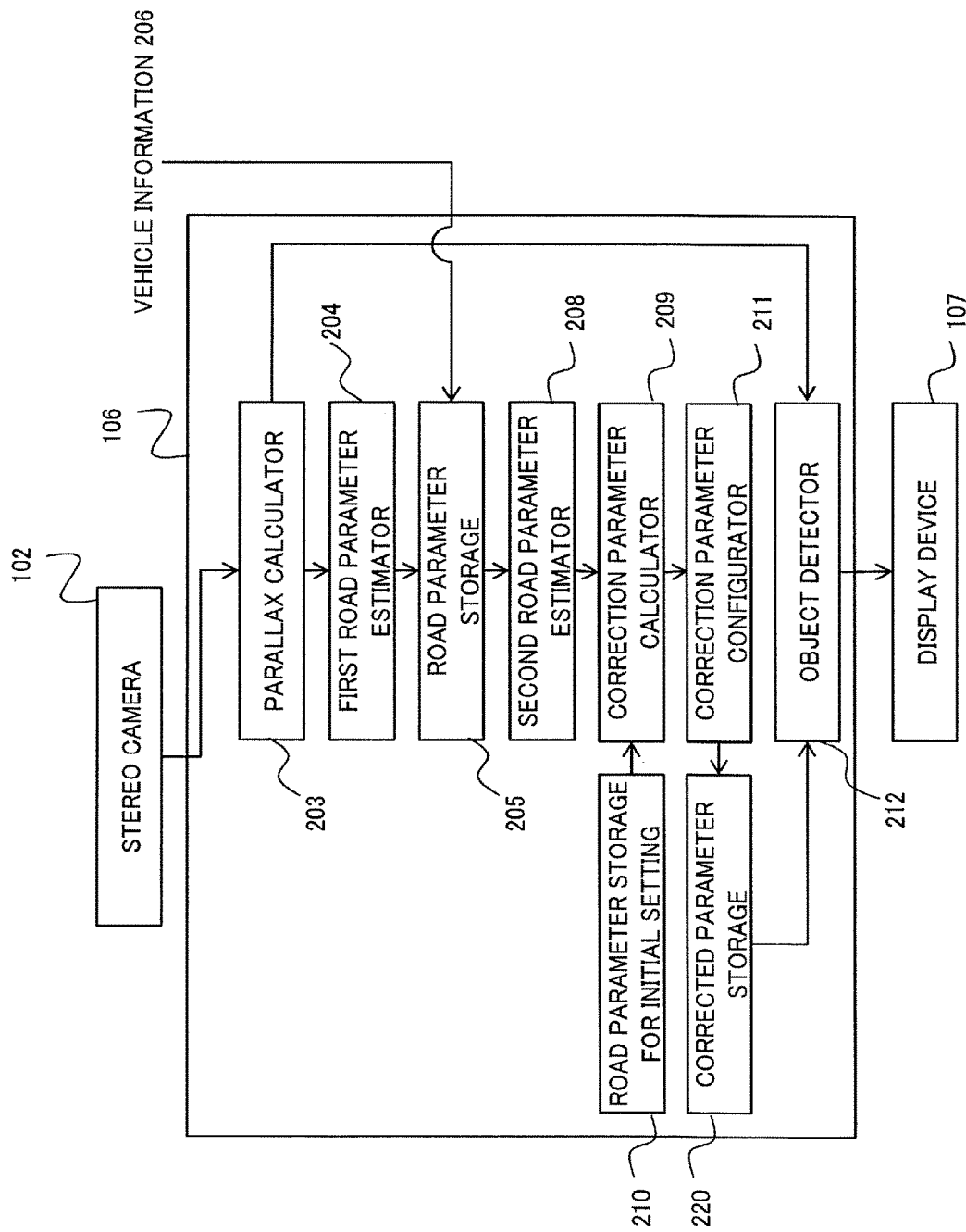
FIG. 2 is a block diagram showing a configuration of an object detection device according to the first embodiment.

Hereinafter, details of the configuration of the calculation device 106 will be described with reference to FIG. 2. FIG. 2 is a block diagram showing the configuration of the calculation device 106 as the object detection device in the present embodiment.

The calculation device 106 includes, as shown in FIG. 2, a parallax calculator 203, a first road parameter estimator 204, a road parameter storage 205, and a second road parameter estimator 208. Furthermore, the calculation device 106 includes a correction parameter calculator 209, a road parameter storage 210 for initial setting, a correction parameter configurator 211, a corrected parameter storage 220, and an object detector 212. Each of the functional units described above is realized by, for example, cooperation of software and hardware in the calculation device 106.

The image from the left and right cameras shot by the left and right cameras 102a and 102b (FIG. 1) of the stereo camera 102 and vehicle information 206 such as the vehicle speed and the yaw rate are input to the calculation device 106. The vehicle information 206 is acquired by the yaw rate sensor 103, the pitch rate sensor 104, and the vehicle speed sensor 105 of FIG. 1.

The parallax calculator 203 obtains the three-dimensional position of each point by calculating the parallax for each pixel of the image of the left and right cameras shot by the stereo camera 102 (details will be described later). The parallax can be obtained by evaluating the similarity of local images as to which pixel the same object appears on in the image of the left camera and the image of the right camera by the sum of the absolute values of luminance difference and the like and by searching for a point with the highest similarity.

The first road parameter estimator 204 obtains, as a road parameter, the length of a perpendicular drawn from the projection center of the camera of the stereo camera 102 to the road surface (details will be described later). The position of the road surface with respect to the camera is considered to be substantially the same as at the initial setting as long as the position of the camera does not greatly shift. From this, a region having a vertical width is set with respect to the road surface at the time of initial setting, the three-dimensional position of the points located in the region is extracted, and the road parameter can be obtained based on the plane where the most of the points fall on.

The road parameter storage 205 is configured with an RAM and the like, and associates and stores the road parameter (first road parameter) obtained by the first road parameter estimator 204 and the vehicle information 206.

The second road parameter estimator 208 extracts a road parameter corresponding to a predetermined condition described later, based on the vehicle information 206 stored in the road parameter storage 205. The road parameter extracted at this time is set to, based on the vehicle speed, the yaw rate, and the pitch rate, the parameter that can be considered to have been obtained while the vehicle 101 is traveling on a non-curved road having no change in slope. Furthermore, by performing statistical processing on the extracted road parameters as described later, the second road parameter estimator 208 obtains a road parameter (second road parameter) when there is no change in slope on the road surface.

The correction parameter calculator 209 calculates the correction amount of the position attitude between the left and right cameras (details described later) by comparing the road parameter obtained by the second road parameter estimator 208 with the road parameter stored in the road parameter storage 210 for initial setting. The road parameter storage 210 for initial setting is configured with, for example, an ROM and stores an initial setting road parameter as a comparison reference.

The correction parameter configurator 211 reflects the correction amount calculated by the correction parameter calculator 209 by recording the correction amount in the corrected parameter storage 220. The corrected parameter storage 220 is configured with, for example, an internal memory of the calculation device 106.

Using the parameter corrected by the correction parameter configurator 211, the object detector 212 converts the parallax obtained by the parallax calculator 203 into three-dimensional information, and detects an object by finding a chunk having a height on the road surface from the distribution (details will be described later).

2. Operation

The operation of the object detection device according to the present embodiment will be described below.

2-1. Outline of Operation

In the present embodiment, the vehicle 101 (FIG. 1) travels on the road surface while shooting a surrounding scene by the mounted stereo camera 102. The calculation device 106 functioning as an object detection device in the vehicle 101 analyzes the image shot by the stereo camera 102 in the parallax calculator 203 (FIG. 2) to generate three-dimensional information of the scene, and the object detector 212 detects an object such as an obstacle on the road surface. Along with such an object detection operation, the calculation device 106 performs calculation processing for determining a scale reference in calibration of the stereo camera 102.

Specifically, in the first road parameter estimator 204, first, the calculation device 106 sequentially calculates the first road parameter for the road surface in the shot image obtained from the stereo camera 102. The first road parameter is calculated from shot images when the vehicle travels on various road surfaces having unevenness and changes in slope. In the present embodiment, the vehicle information 206 regarding the movement state of the vehicle 101 traveling on such a road surface is acquired using the various sensors 103 to 105, and the vehicle information 206 and the first road parameter are associated and stored in the road parameter storage 205.

Among the stored first road parameters, the second road parameter estimator 208 of the calculation device 106 calculates the second road parameter using the first road parameter considered to have been obtained while the vehicle 101 is traveling straight on the road surface having no change in slope. The second road parameter becomes a scale reference with a higher accuracy than that of the first road parameter at the time of traveling on the road surface having a change in slope or in a curve, and is capable of performing calibration of the stereo camera 102 with high accuracy.

The calibration using the second road parameter is performed by the correction parameter calculator 209, and the calibration result is recorded in the corrected parameter storage 220 by the correction parameter configurator 211. The object detector 212 can accurately detect the position of an object or the like in a scene using information based on an image shot in real time by the stereo camera 102 and a corrected parameter.

Hereinafter, details of the operation of the object detection device in the present embodiment will be described.

2-2. Measurement Principle of Stereo Camera

In the present embodiment, measurement of three-dimensional information using the stereo camera 102 is performed by the parallel stereo method. The measurement principle of three-dimensional information obtained from the stereo camera 102 will be described with reference to FIG. 3.

Figure 3:
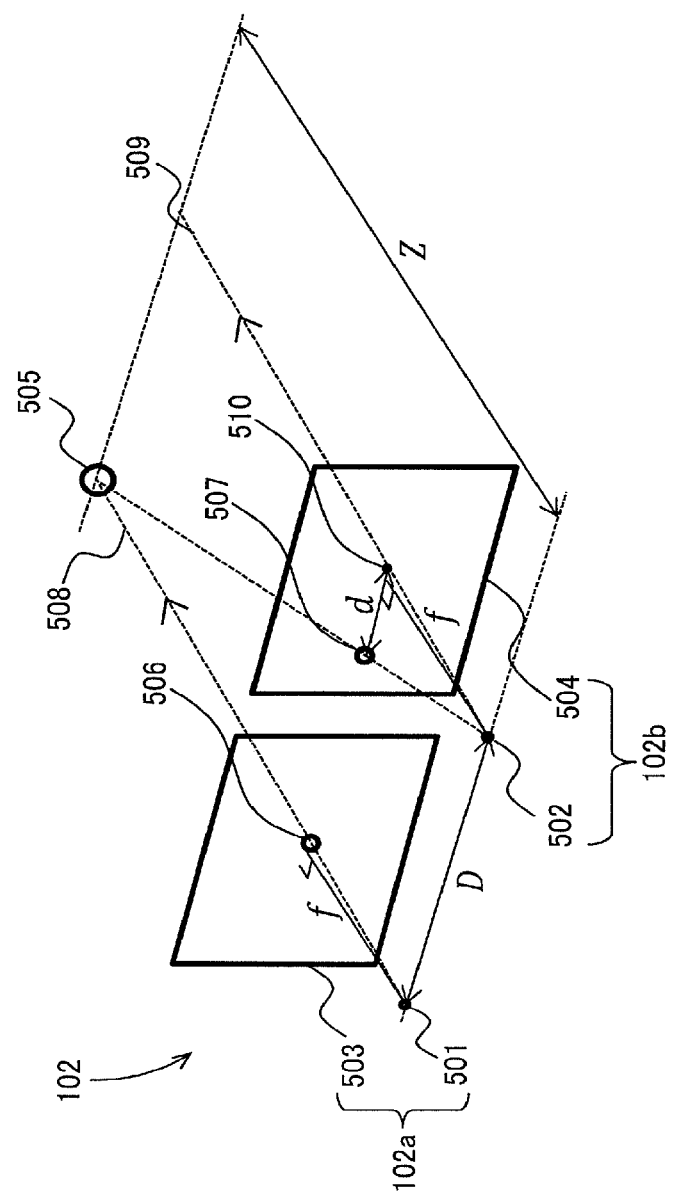
FIG. 3 is a diagram for describing a measurement principle with a stereo camera.

FIG. 3 schematically shows the left and right cameras 102a and 102b in the stereo camera 102 using a pinhole model. The left camera 102a has an imaging plane 503 and a projection center 501 at an interval of a focal distance f from the center of the imaging plane 503. The right camera 102b has an imaging plane 504 and the projection center 501 at the interval of the focal distance f from the center of the imaging plane 504.

With the parallel stereo method, as shown in FIG. 3, three-dimensional information is measured with the imaging plane 503 of the left camera 102a and the imaging plane 504 of the right camera 102b being set in parallel.

When a measurement target 505 is shot by the stereo camera 102, the target 505 is imaged at a point 506 on the imaging plane 503 with the left camera 102a, and is imaged at a point 507 on the imaging plane 504 with the right camera 102b. The two-dimensional coordinates of the measurement target 505 are calculated based on the coordinates of the point 506 on the imaging plane 503 of the left camera 102a, for example. The point 506 is located at a position where a line 508 connecting the projection center 501 of the left camera 102a and the measurement target 505 pass through the imaging plane 503 of the left camera 102a.

Here, a parallax d with respect to the measurement target 505 is defined as the distance between a point 510 at which a line 509, which is parallel to the line 508 described above and passes through a projection center 502 of the right camera 102b, passes through the imaging plane 504 of the right camera 102b and the point 507 at which the target 505 is actually imaged by the right camera 102b. A distance Z from the stereo camera 102 (for example, the projection center 501 of the left camera 102a) to the measurement target 505 is calculated by the following expression using the parallax d.

$$Z = f \cdot D / d \quad (1)$$

In Expression (1) above, a baseline length D is defined as the distance between the projection center 501 of the left camera 102a and the projection center 502 of the right camera 102b.

2-3. Parallax Calculator

Figure 4:
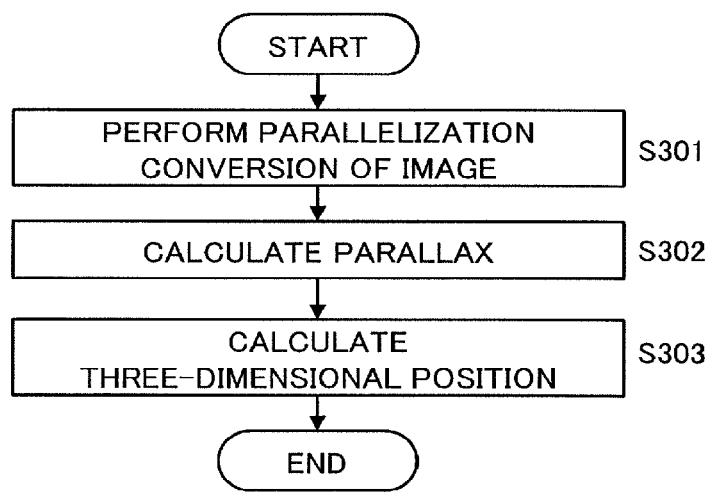
FIG. 4 is a flowchart showing processing in a parallax calculator.

The operation of the parallax calculator 203 operating based on the measurement principle as described above will be described with reference to FIG. 4. FIG. 4 is a flowchart showing processing in the parallax calculator 203.

The flowchart shown in FIG. 4 is performed, for example, in a predetermined cycle (for example, 1/30 seconds) by the calculation device 106 functioning as the parallax calculator 203.

First, the parallax calculator 203 performs parallelization conversion (S301) for applying the parallel stereo method (FIG. 3) by distortion correction conversion and plane conversion using the images shot by the left and right cameras 102a and 102b of the stereo camera 102 as inputs.

Figure 5A:
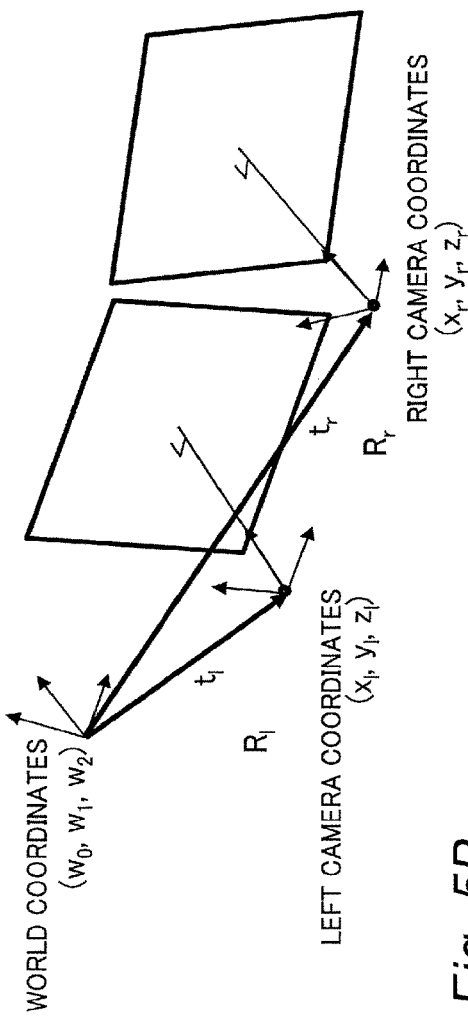
FIGS. 5A and 5B are diagrams for describing image parallelization correction of the stereo camera.
Figure 5B:
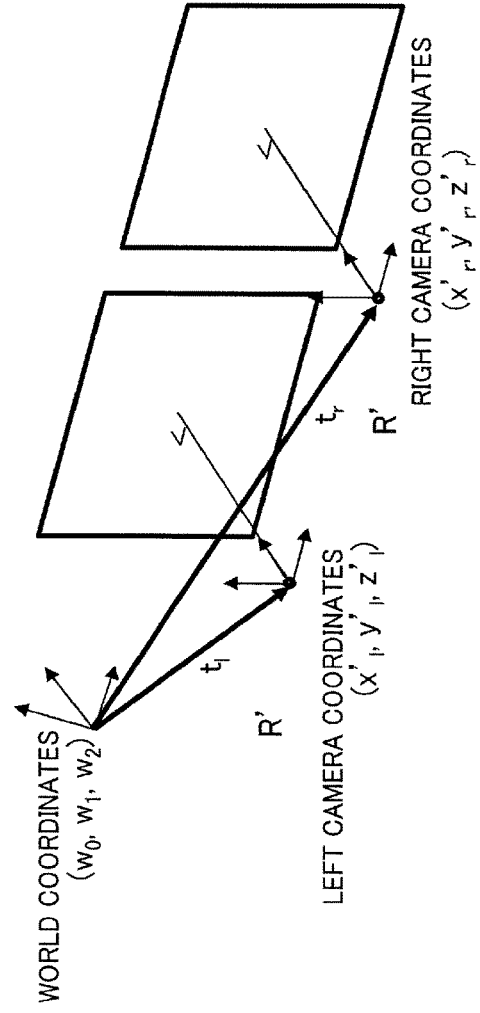

The processing of step S301 is processing for correcting the left image by the left camera 102a and the right image by the right camera 102b to be parallelized with respect to the difference in the direction of the left and right cameras 102a and 102b (see FIGS. 5A and 5B). Details of step S301 will be described later.

Next, the parallax calculator 203 performs image processing based on the parallel stereo method to calculate the parallax d (FIG. 3) of all points in the image shot by the stereo camera 102 (S302).

In step S302, for example, in order to obtain the parallax of a specific focused point on the left image, the parallax calculator 203 clips an image near the focused point from the left image as a template, and searches for a part with a high similarity to the clipped template in the right image. Next, based on the search result, the parallax calculator 203 determines a point with the highest similarity in the right image as the corresponding point and calculates the parallax d based on the distance between the determined corresponding point and the focused point.

Since the parallel stereo method is used in the present embodiment, when the coordinates of the focused point on the left image are $(x_p, y_p)$, the part where the corresponding point can appear in the right image is limited to a straight line whose y coordinate is $y_p$. Therefore, the parallax calculator 203 performs the corresponding point search only on the same straight line, and can omit the processing for the other parts. In addition, it is possible to use SAD (Sum of Absolute Differences), SSD (Sum of Squared Differences), or the like as a calculation method of the degree of similarity using the template above.

Next, the parallax calculator 203 calculates the three-dimensional position of each point in the image by performing the calculation according to Expression (1) above using the calculated parallax d of each point (S303). The parallax calculator 203 performs the calculation processing of step S303 using, for example, an initially set baseline length.

The parallax calculator 203 outputs three-dimensional information indicating the three-dimensional position calculated in step S302 to the first road parameter estimator 204, outputs information indicating the parallax d calculated in step S302 to the object detector 212, and ends the processing according to this flowchart.

According to the above processing, the image by each of the cameras 102a and 102b of the stereo camera 102 is parallelized (S301), and the parallax d and three-dimensional information can be calculated based on the parallel stereo method. Details of step S301 will be described with reference to FIGS. 5A and 5B.

FIG. 5A shows left camera coordinates $(x_1, y_1, z_1)$ and right camera coordinates $(x_r, y_r, z_r)$ before the parallelization in step S301. FIG. 5B shows left camera coordinates $(x'_1, y'_1, z'_1)$ and right camera coordinates $(x'_r, y'_r, z'_r)$ after the parallelization in step S301. The left camera coordinates are a coordinate system whose origin is the projection center of the left camera 102a in the stereo camera 102. The right camera coordinates are a coordinate system whose origin is the projection center of the right camera 102b.

In order to perform the parallelization conversion in step S301, it is necessary to obtain internal parameters and external parameters of the left and right cameras 102a and 102b in the stereo camera 102. The internal parameters represent camera focal length, image center coordinates, distortion parameters, and the like. The external parameters represent the position and attitude of the camera in the world coordinate system, which is a fixed coordinate system. For example, by setting the world coordinate system in advance and using the method described in Non-Patent Document 1, the calculation device 106 can calculate the internal parameters of the left and right cameras 102a and 102b and the external parameters of the left and right cameras 102a and 102b in the common world coordinate system.

In step S301, the calculation device 106 as the parallax calculator 203 performs distortion correction conversion on each of the left and right cameras 102a and 102b using the calculated internal parameters, performs plane conversion using the calculated external parameters, and performs the parallelization conversion (S301).

It is assumed that before step S301, due to the positional shift of the stereo camera 102, the left camera coordinates $(x_1, y_1, z_1)$ and the right camera coordinates $(x_r, y_r, z_r)$ face in the directions different from each other as shown in FIG. 5A. These positional relationships can be expressed by translation vectors $t_1$ and $t_r$ and rotation matrices $R_l$ and $R_r$ of the following expression on a basis of world coordinates $(w_0, w_1, w_2)$.

[Math. 1]

$$t_l = \begin{pmatrix} t_{l,0} \\ t_{l,1} \\ t_{l,2} \end{pmatrix} \quad (11)$$

$$t_r = \begin{pmatrix} t_{r,0} \\ t_{r,1} \\ t_{r,2} \end{pmatrix} \quad (12)$$

$$R_l = \begin{pmatrix} r_{l,00} & r_{l,01} & r_{l,02} \\ r_{l,10} & r_{l,11} & r_{l,12} \\ r_{l,20} & r_{l,21} & r_{l,22} \end{pmatrix} \quad (13)$$

$$R_r = \begin{pmatrix} r_{r,00} & r_{r,01} & r_{r,02} \\ r_{r,10} & r_{r,11} & r_{r,12} \\ r_{r,20} & r_{r,21} & r_{r,22} \end{pmatrix} \quad (14)$$

The translation vectors $t_1$ and $t_r$ and the rotation matrices $R_l$ and $R_r$ in Expressions (11) to (14) constitute external parameters of each of the cameras 102a and 102b in the stereo camera 102. The calculation device 106 can obtain the translation vectors $t_l$ and $t_r$ and the rotation matrices $R_l$ and $R_r$ using a known method as described above.

The translation vector $t_l$ of Expression (11) is a three-dimensional vector representing translation from the origin of the world coordinates $(w_0, w_1, w_2)$ to the origin of the left camera coordinates $(x_1, y_1, z_1)$. The translation vector $t_r$ of Expression (12) is a three-dimensional vector representing translation from the origin of the world coordinates $(w_0, w_1, w_2)$ to the origin of the right camera coordinates $(x_r, y_r, z_r)$.

In addition, the rotation matrix $R_l$ of Expression (13) is a matrix that represents rotation from the direction of the world coordinates $(w_0, w_1, w_2)$ to the direction of the left camera coordinates $(x_l, y_l, z_l)$. The rotation matrix $R_r$ of Expression (14) is a matrix that represents rotation from the direction of the world coordinates $(w_0, w_1, w_2)$ to the direction of the right camera coordinates $(x_r, y_r, z_r)$. Each of the rotation matrices $R_l$ and $R_r$ has three degrees of freedom corresponding to the yaw direction, the pitch direction, and the roll direction between the 3×3 components $r_{l,00}$ to $r_{l,22}$ and $r_{r,00}$ to $r_{r,22}$.

According to the translation vectors $t_l$ and $t_r$ and the rotation matrices $R_l$ and $R_r$ of Expressions (11) to (14), a rotation matrix R' as in the following expression can be obtained.

[Math. 2]

$$R' = (r'_{*0} \ r'_{*1} \ r'_{*2}) \quad (15)$$

$$r'_{*0} = \frac{t_r - t_l}{|t_r - t_l|} \quad (16)$$

$$r'_{*1} = r_{l,*1} = \begin{pmatrix} r_{l,01} \\ r_{l,11} \\ r_{l,21} \end{pmatrix} \quad (17)$$

$$r'_{*2} = r'_{*0} \times r'_{*1} \quad (18)$$

The rotation matrix R' of Expression (15) corresponds to rotation conversion between each of the camera coordinates $(x'_1, y'_l, z'_1)$ and $(x_r, y_r, z_r)$ and the world coordinates $(w_0, w_1, w_2)$ of FIG. 5B. Note that "x" in Expression (18) is an outer product between vectors.

Using the rotation matrices $R_l$, $R_r$, and R' described above, the calculation device 106, as the parallax calculator 203 in step S301 in FIG. 4, performs plane conversion in accordance with the following expressions.

[Math. 3]

$$\begin{pmatrix} x'_l \\ y'_l \\ z'_l \end{pmatrix} = R' R_l^{-1} \begin{pmatrix} x_l \\ y_l \\ z_l \end{pmatrix} \quad (19)$$

$$\begin{pmatrix} x'_r \\ y'_r \\ z'_r \end{pmatrix} = R' R_r^{-1} \begin{pmatrix} x_r \\ y_r \\ z_r \end{pmatrix} \quad (20)$$

According to the plane conversion of Expressions (19) and (20) above, the left camera coordinates $(x_1, y_1, z_1)$ and the right camera coordinates $(x_r, y_r, z_r)$ of FIG. 5A can be parallelized to each other as shown in FIG. 5B.

2-4. First Road Parameter Estimator

Figure 6:
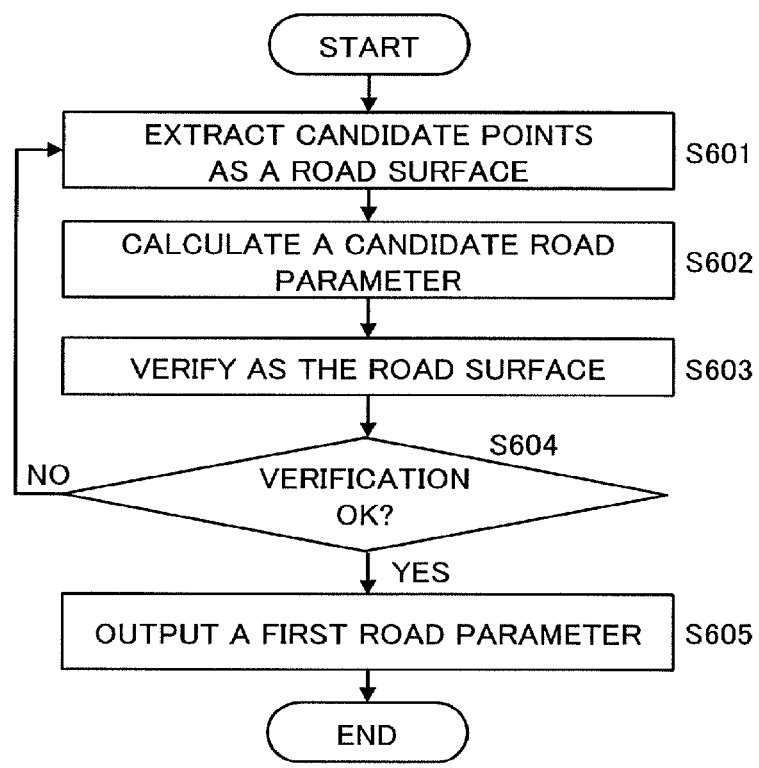
FIG. 6 is a flowchart showing processing in a first road parameter estimator.

The operation of the first road parameter estimator 204 based on the three-dimensional information calculated by the parallax calculator 203 as described above will be described with reference to FIG. 6. FIG. 6 is a flowchart showing processing in the first road parameter estimator 204.

The flowchart shown in FIG. 6 is sequentially performed by the calculation device 106 functioning as the first road parameter estimator 204, for example, after the processing in the parallax calculator 203.

First, the first road parameter estimator 204 extracts candidate points that can be considered as the road surface by randomly selecting three points from among all the points at which the three-dimensional positions, for example, are calculated based on the three-dimensional information (S303 in FIG. 4) from the parallax calculator 203 (S601). At this time, the first road parameter estimator 204 limits, for example, the selection of the third point so that not all of the selected three points are on the same straight line.

Next, the first road parameter estimator 204 obtains a plane passing through the three points extracted as candidate points on the road surface, and calculates a candidate road parameter indicating the distance to the obtained plane (S602). Based on the three-dimensional information from the parallax calculator 203, the first road parameter estimator 204 obtains a perpendicular drawn to a plane obtained from, for example, the projection center of the camera in the stereo camera 102 and calculates the length of the perpendicular as a candidate road parameter.

Next, the first road parameter estimator 204 performs calculation processing for verifying the correspondence relationship between the plane on which the candidate road parameter has been calculated and the actual road surface (S603). Specifically, the first road parameter estimator 204 calculates the distance between each point whose three-dimensional position is calculated by a three-dimensional position calculation 303 or each point in a predetermined region and the plane obtained in step S602 and counts the number of points whose distance is less than a predetermined threshold. The threshold is a reference value for determining a point substantially on the same plane as the plane above plane.

Based on the processing result of step S603, the first road parameter estimator 204 determines whether it has been verified that the plane of the candidate road parameter matches the actual road surface (S604).

Specifically, if the number of counted points is less than a predetermined constant ratio with respect to the number of all the points for which the distance is calculated, the first road parameter estimator 204 determines that it has not been verified that the plane of the candidate road parameter matches the actual road surface (NO in S604). In this case, the first road parameter estimator 204 repeats the processing in and after step S601 to calculate a candidate road parameter based on a new candidate point.

On the other hand, if the number of counted points is equal to or more than the above ratio, the first road parameter estimator 204 determines that it has been verified that the plane of the candidate road parameter matches the actual road surface (YES in S604). In this case, the first road parameter estimator 204 outputs the calculated candidate road parameter as the first road parameter to the road parameter storage 205 (S605).

After outputting the first road parameter (S605), the first road parameter estimator 204 ends the processing according to this flowchart.

According to the above processing, based on the three-dimensional information calculated by the parallax calculator 203, the first road parameter for the road surface that changes momentarily when the vehicle 101 (FIG. 1) moves is calculated.

Furthermore, in synchronization with the above processing, the calculation device 106 acquires the vehicle information 206 from the various sensors 103 to 105 (FIG. 1). The calculation device 106 causes the road parameter storage 205 to store the road parameters obtained by the first road parameter estimator 204 in association with vehicle information 206.

2-5. Second Road Parameter Estimator

Figure 7:
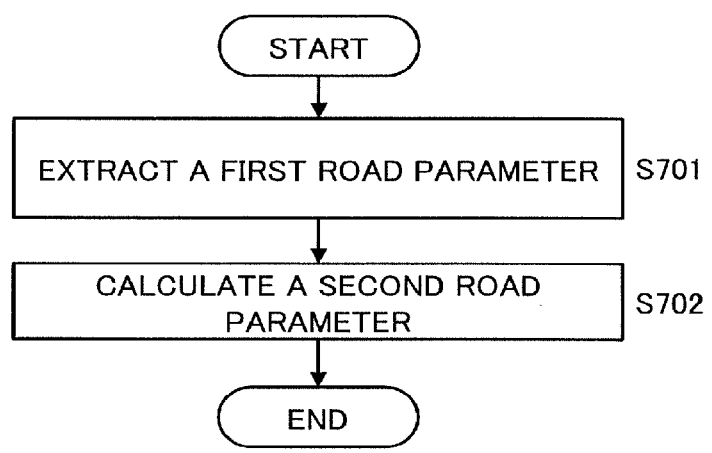
FIG. 7 is a flowchart showing processing in a second road parameter estimator.

The operation of the second road parameter estimator 208 based on information stored in the road parameter storage 205 such as the first road parameter will be described with reference to FIG. 7. FIG. 7 is a flowchart showing the processing in the second road parameter estimator 208.

The flowchart shown in FIG. 7 is performed, for example, in a predetermined cycle by the calculation device 106 functioning as the second road parameter estimator 208. The cycle is set based on a period in which new information is considered to be sufficiently stored in the road parameter storage 205 (for example, one minute).

Based on the information stored in the road parameter storage 205, first, the second road parameter estimator 208 extracts a first road parameter corresponding to a predetermined condition from among the stored first road parameters (S701). The predetermined condition for extracting the first road parameter will be described with reference to FIG. 8.

Figure 8:
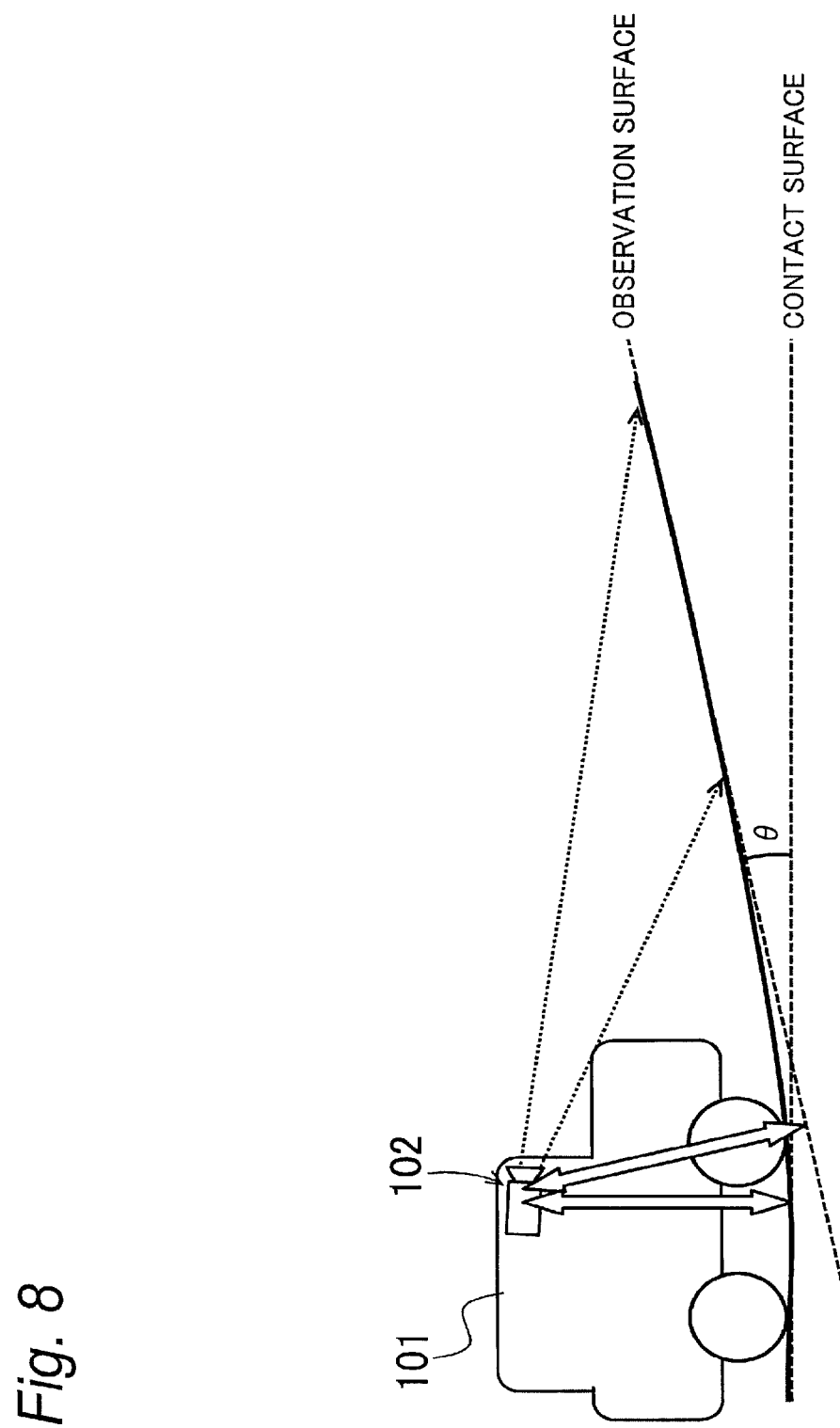
FIG. 8 is a diagram for describing a state of traveling on a road surface with slope variation.

FIG. 8 shows the vehicle 101 traveling on a road surface with slope variation. In the present embodiment, the stereo camera 102 shoots an image of the road surface in front of the vehicle 101. For this reason, as shown in FIG. 8, when there is a change in the slope on the road surface while the vehicle 101 is traveling, there is an angular difference 8 occurring in the pitch direction or the like between an observation plane observed from the stereo camera 102 and a contact area of the vehicle 101 at the time of observation. The first road parameter calculated in this case corresponds to the distance from the stereo camera 102 to the observation plane, and is considered to shift from the distance to the contact area of the vehicle 101.

In addition, when the vehicle 101 travels in a curve, it is considered that the angular difference 8 occurs, for example, in the yaw direction between the observation plane from the stereo camera 102 and the contact area of the vehicle 101. For this reason, as in the case described above, the first road parameter calculated while the vehicle 101 is traveling in a curve is considered to shift from the distance to the contact area of the vehicle 101.

Therefore, in the present embodiment, extraction of the first road parameter is performed using the predetermined condition that the angular difference 9 between the observation plane from the stereo camera 102 and the contact area of the vehicle 101 at the time of observation is within a predetermined angle. The predetermined angle is an angle at which the observation plane and the contact area can be considered to be substantially parallel, that is, an angle at which substantially no change in slope can be considered on the road surface while the vehicle 101 is traveling. For example, the predetermined angle is within ±1 degree.

In step S701 of FIG. 7, using the vehicle information 206 such as the vehicle speed, the yaw rate, and the pitch rate in order to determine the predetermined condition described above, the second road parameter estimator 208 performs condition search in the stored first road parameters. For example, the second road parameter estimator 208 extracts the first road parameter associated with the vehicle information 206 whose vehicle speed is 40 km/h or more and whose yaw rate and pitch rate are within a predetermined range near zero.

Next, the second road parameter estimator 208 calculates a second road parameter by performing statistical processing based on the extracted first road parameter (S702). For example, in statistical processing, the second road parameter estimator 208 obtains as second road parameters an average value or a median value of the extracted first road parameters.

The second road parameter estimator 208 outputs the calculated second road parameter as a calibration scale reference to the correction parameter calculator 209 (S702), and ends the processing according to this flowchart.

According to the above-described processing, the first road parameter under the condition with less variation that can be used as the calibration scale reference is extracted by the condition search based on the vehicle information 206 (S701). Furthermore, by performing statistical processing using the extracted first road parameter (S702), it is possible to accurately estimate the second road parameter indicating the distance to the road surface having no change in slope.

2-6. Correction Parameter Calculator

Figure 9:
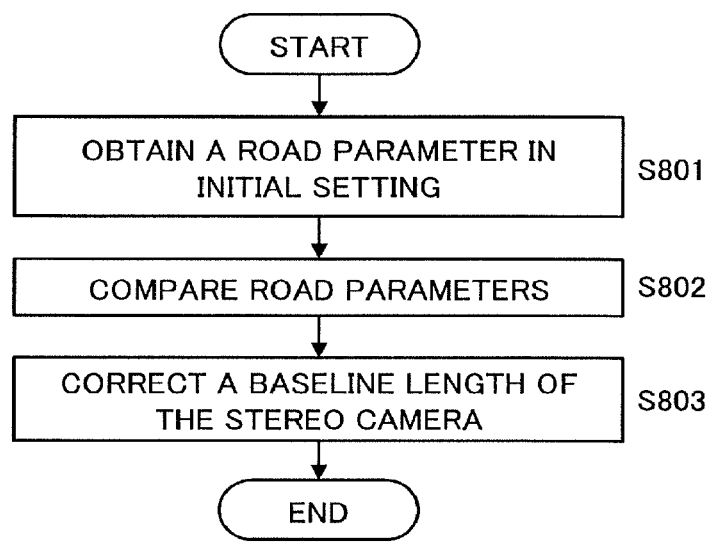
FIG. 9 is a flowchart showing processing in a correction parameter calculator.

The operation of the correction parameter calculator 209 for realizing calibration based on the second road parameter calculated by the second road parameter estimator 208 will be described with reference to FIG. 9. FIG. 9 is a flowchart showing the processing in the correction parameter calculator 209.

The flowchart shown in FIG. 9 is sequentially performed by the calculation device 106 functioning as the correction parameter calculator 209, for example, after performing the above-described processing (FIG. 7) by the second road parameter estimator 208.

It is assumed that at the start of the flowchart of FIG. 9, the road parameter storage 210 for initial setting stores in advance a reference road parameter measured in advance under the condition having no change in slope at the time of initial setting and a baseline length $D_0$ at the time of initial setting.

The above-described initial setting is performed, for example, before shipping the object detection device (calculation device 106) or before starting to use the object detection device. In the initial setting, for example, a checkerboard having a known size and the number of intersections in which a checkered pattern is drawn is placed on the road surface and shot by the stereo camera 102. Furthermore, by detecting the intersections of the checkered pattern from the shot image and applying the camera calibration method described in Chapter 6 of Non-Patent Document 2, it is possible to obtain the reference road parameter under the condition having no change in slope.

In the flowchart of FIG. 9, the correction parameter calculator 209 first reads out the reference road parameter stored in the road parameter storage 210 for initial setting (S801).

Next, the correction parameter calculator 209 compares the second road parameter (S702 in FIG. 7) calculated by the second parameter estimator 208 with the reference road parameter having been read out and obtains the change amount by, for example, dividing the two parameters (S802). According to the change amount in step S802, it is possible to recognize a change between the current installation state of the stereo camera 102 and the initial setting time.

Next, using the obtained change amount, the correction parameter calculator 209 corrects the baseline length of the stereo camera 102 (S803). Specifically, the correction parameter calculator 209 calculates the corrected baseline length D by calculating the following expression.

$$D=(H/H_0)D_0 \qquad (2)$$

In the above expression (2), $H_0$ denotes the length of a perpendicular (reference road parameter) drawn from the projection center of the camera at the time of initial setting to the road surface. H denotes the length of a perpendicular (second road parameter) drawn from the projection center of the camera in the current installation state of the stereo camera 102 to the road surface.

The correction parameter calculator 209 outputs the corrected baseline length D to the correction parameter configurator 211 (S803), and ends the processing according to this flowchart.

According to the above process, the baseline length of the stereo camera 102 is corrected using the second road parameter as a scale reference in accordance with the current installation state of the stereo camera 102 (S803). The relationship between each road parameter and the baseline length will be described with reference to FIGS. 10A to 10C.

Figure 10A:
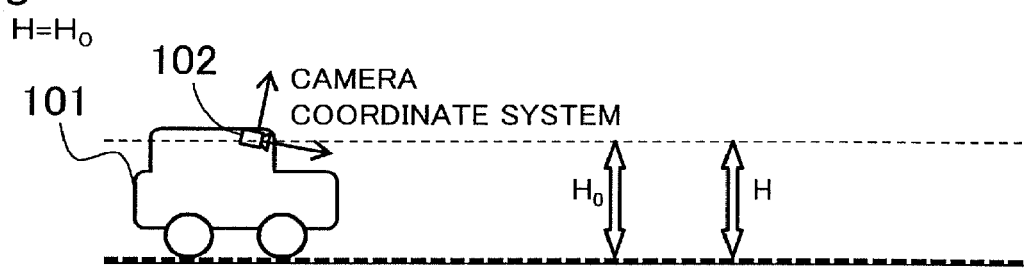
FIGS. 10A to 10O are diagrams for describing how the road surface looks while the vehicle is moving straight on a road without slope variation.

FIGS. 10A to 10A are diagrams for describing how the road surface looks based on the stereo camera 102 before calibration when the vehicle 101 travels straight on a road without slope variation.

FIG. 10A shows how the road surface looks when the second road parameter matches the reference road parameter. In the case of FIG. 10A, the distance to the road surface calculated based on the image shot by the stereo camera 102 does not particularly change from the initial setting, and it is hence considered that the distance is appropriately calculated. In this case, the baseline length D after correction by the correction parameter calculator 209 is $D=D_0$ based on Expression (2).

Figure 10B:
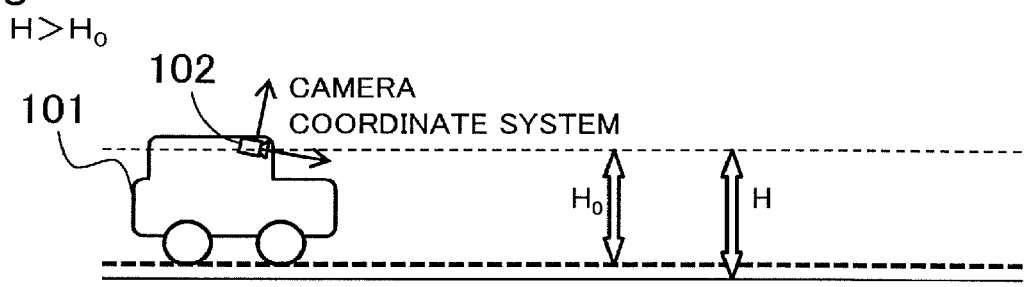

FIG. 10B shows how the road surface looks when the second road parameter is larger than the reference road parameter. In the case of FIG. 10B, in the stereo camera 102, a positional shift occurs as a measurement result as if the distance to the road surface has changed far. In this case, it is considered that the distance between the cameras 102a and 102b of the stereo camera 102 is larger than that at the time of initial setting. Therefore, based on Expression (2), the correction parameter calculator 209 calculates the corrected baseline length D so as to extend the baseline length Do at the time of initial setting (S802).

Figure 10C:
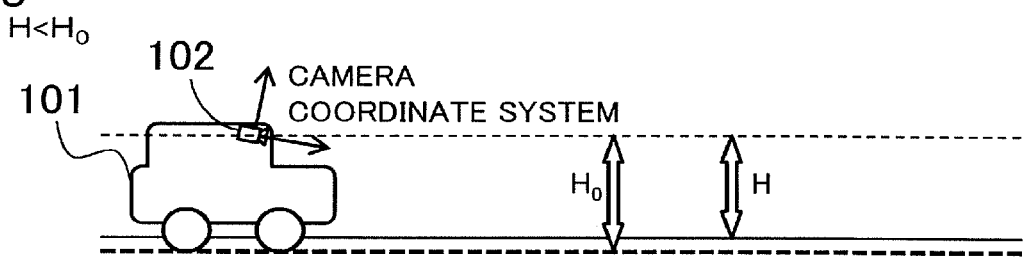

FIG. 10C shows how the road surface looks when the second road parameter is smaller than the reference road parameter. In the case of FIG. 10C, in the stereo camera 102, a positional shift occurs such that the distance to the road surface is calculated closer than the actual distance, and it is considered that the distance between the cameras 102a and 102b becomes narrower than that at the time of initial setting. Therefore, based on Expression (2), the correction parameter calculator 209 performs correction so as to narrow the baseline length D (S802).

As described above, based on the change in the second road parameter from the road parameter at the time of initial setting (reference), it is possible to recognize the change in the distance between the cameras 102a and 102b and obtain the appropriate baseline length D in accordance with the current contact area obtained from the stereo camera 102 (S803).

After performing the processing in the correction parameter calculator 209 described above, the correction parameter configurator 211 updates the corrected baseline length D by writing the baseline length D having been output from the correction parameter calculator 209 into the corrected parameter storage 220. The update timing at which the correction parameter configurator 211 updates the baseline length D is appropriately set such as a predetermined cycle or when the calculation device 106 is turned on/off.

2-7. Object Detector

Figure 11:
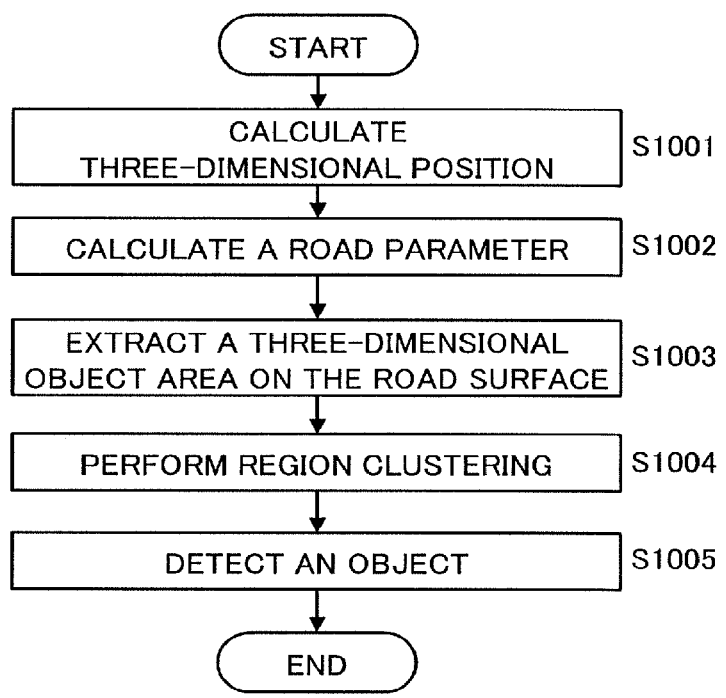
FIG. 11 is a flowchart showing processing in an object detector.

The operation of the object detector 212 will be described with reference to FIG. 11. FIG. 11 is a flowchart showing the processing in the object detector 212.

The flowchart shown in FIG. 11 is performed by the calculation device 106 functioning as the object detector 212, for example, in a predetermined cycle (for example, 1/30 seconds).

First, with reference to the information stored in the corrected parameter storage 220, the object detector 212 calculates the three-dimensional position of each point based on the parallax (S302 in FIG. 4) of all the points in the shot image calculated by the parallax calculator 203 (S1001). In step S1001, the object detector 212 performs the same processing as in S303 of FIG. 4, and when calculating the distance Z based on the parallax d, it uses the corrected baseline length D stored in the corrected parameter storage 220.

Next, based on the calculated three-dimensional position, the object detector 212 performs, for example, the same processing as in the flowchart of FIG. 6 to calculate the road parameter in the scene where the vehicle is currently traveling (S1002).

Next, based on the calculated road parameter, the object detector 212 extracts a point group having a three-dimensional position above the road surface corresponding to the calculated road parameter from among all the points in the shot image (S1003).

Next, the object detector 212 performs region clustering with the extracted point group as an input, and obtains a collection (cluster) of the point group considered to be a solid object on the road surface (S1004). Region clustering in step S1004 can be realized, for example, by using the Mean Shift method disclosed in Non-Patent Document 3.

Next, the object detector 212 outputs, for example, to the display device 107, object information indicating the three-dimensional object extracted in the region clustering (S1004) as the object of the detection result (S1005).

After outputting the object information of the detection result (S1005), the object detector 212 ends the processing according to this flowchart.

According to the above processing, the object detector 212 can accurately detect the three-dimensional position of the object using the corrected baseline length D. The display device 107 displays the object information (S1005) detected by the above processing.

3. Summary

As described above, the object detection device (calculation device 106) according to the present embodiment detects an object based on an image obtained from the stereo camera 102 on the vehicle 101. The object detection device includes the parallax calculator 203, the first road parameter estimator 204, the road parameter storage 205, the second road parameter estimator 208, and the object detector 212. The parallax calculator 203 calculates three-dimensional information of a scene in the image. Based on the three-dimensional information, the first road parameter estimator 204 calculates the first road parameter indicating the distance between the road surface on which the vehicle 101 is traveling and the stereo camera 102. The road parameter storage 205 associates and stores the first road parameter and the vehicle information 206 related to the traveling state of the vehicle 101. Based on the vehicle information 206 and the first road parameter stored by the road parameter storage 205, the second road parameter estimator 208 calculates a second road parameter using the first road parameter under a predetermined condition regarding the vehicle. The object detector 212 detects an object using the second road parameter. The predetermined condition includes a condition that the angular difference between the road surface observed from the stereo camera 102 and a contact area of the vehicle at the time of observation is within a predetermined angle.

According to the object detection device described above, by grasping the traveling state (motion) of the vehicle 101 from the vehicle information 206 and thus estimating the change in slope of the road on which the vehicle is traveling, it is possible to improve the estimation accuracy of the road parameter when the vehicle 101 is positioned on the road surface having no change in slope obtained by the second road parameter estimator 208.

This improves the estimation accuracy of the shift amount when the shift of the positional relationship between the two cameras occurs with age, and hence also improves the distance detection accuracy to the object in consideration of the shift amount. This allows a highly reliable operation to be maintained in an application using object position information.

In the present embodiment, based on the vehicle information 206 stored by the road parameter storage 205, the second road parameter estimator 208 extracts, from the first road parameters, the first road parameter in a case where the predetermined condition is met. The second road parameter estimator 208 calculates the second road parameter by performing statistical processing based on the extracted first road parameter. As a result, from among the stored first road parameters, the first road parameter while the vehicle is traveling on the road having no change in slope is extracted and becomes a target of statistical processing, and thus the second road parameter can be accurately calculated.

Note that in the above example, the first road parameter calculated while the vehicle is traveling on a road having no change in slope is extracted from among the stored first road parameters. However, the present invention is not limited to this and the present object detection device may be configured to store only the first road parameter calculated while the vehicle is traveling on the road having no change in slope, for example.

Further, in the present embodiment, the predetermined condition described above may be a condition indicating that the road surface observed from the stereo camera 102 and the contact area of the vehicle at the time of observation are in the same plane having no change in the slope. For example, the condition may be set by appropriately setting the above-mentioned predetermined angle to near 0 degrees within the range of the allowable error. As a result, the second road parameter can be calculated by limiting to the first road parameter while the vehicle is traveling on a flat road surface, and the calibration accuracy for the stereo camera 102 can be improved.

Moreover, in the present embodiment, the vehicle information 206 includes the vehicle speed, the yaw rate, and the pitch rate in the vehicle 101. The vehicle information 206 may additionally or alternatively include, for example, a roll rate, a steering angle, and an inclination angle of the vehicle 101. For example, a roll rate sensor or a posture sensor may be mounted on the vehicle 101 as a vehicle information detector, or the calculation device 106 may monitor the operation state of the steering of the vehicle 101.

Further, in the present embodiment, the above-mentioned predetermined condition is specifically set as that the yaw rate, pitch rate, or roll rate in the vehicle information 206 is a value within a predetermined range corresponding to a state where the vehicle 101 travels on the straight road. The above-mentioned predetermined condition is not limited to this. It may be, for example, that the steering angle in the vehicle information 206 is a value within a predetermined range corresponding to the steering when the vehicle is traveling straight or that the inclination angle in the vehicle information 206 is a value within a predetermined range corresponding to a state where the vehicle is traveling on a horizontal road surface.

Further, in the present embodiment, the object detection device further includes the correction parameter calculator 209 and the correction parameter configurator 211. The correction parameter calculator 209 compares the second road parameter with a preset reference road parameter, and calculates a correction parameter in accordance with the shift amount of the stereo camera 102. The correction parameter configurator 211 corrects a camera parameter related to the stereo camera based on the correction parameter. Using the baseline length D that is the camera parameter corrected by the correction parameter configurator 211, the object detector 212 detects the position of the object. This allows the object detection device to accurately detect the position of the object by correcting the shift amount of the stereo camera 102.

In addition, the vehicle 101 according to the present embodiment includes the object detection device, the stereo camera 102 for shooting an image, and the various sensors 103 to 105 for detecting the vehicle information 206. According to the vehicle 101 according to the present embodiment, the object detection device can accurately detect the object by correcting the positional shift of the stereo camera 102.

Second Embodiment

In the first embodiment, vehicle information related to the traveling state of the vehicle is detected by the vehicle speed sensor or the like. In the second embodiment, an object detection device for detecting the lane shape of the road on which the vehicle travels will be further described.

Figure 12:
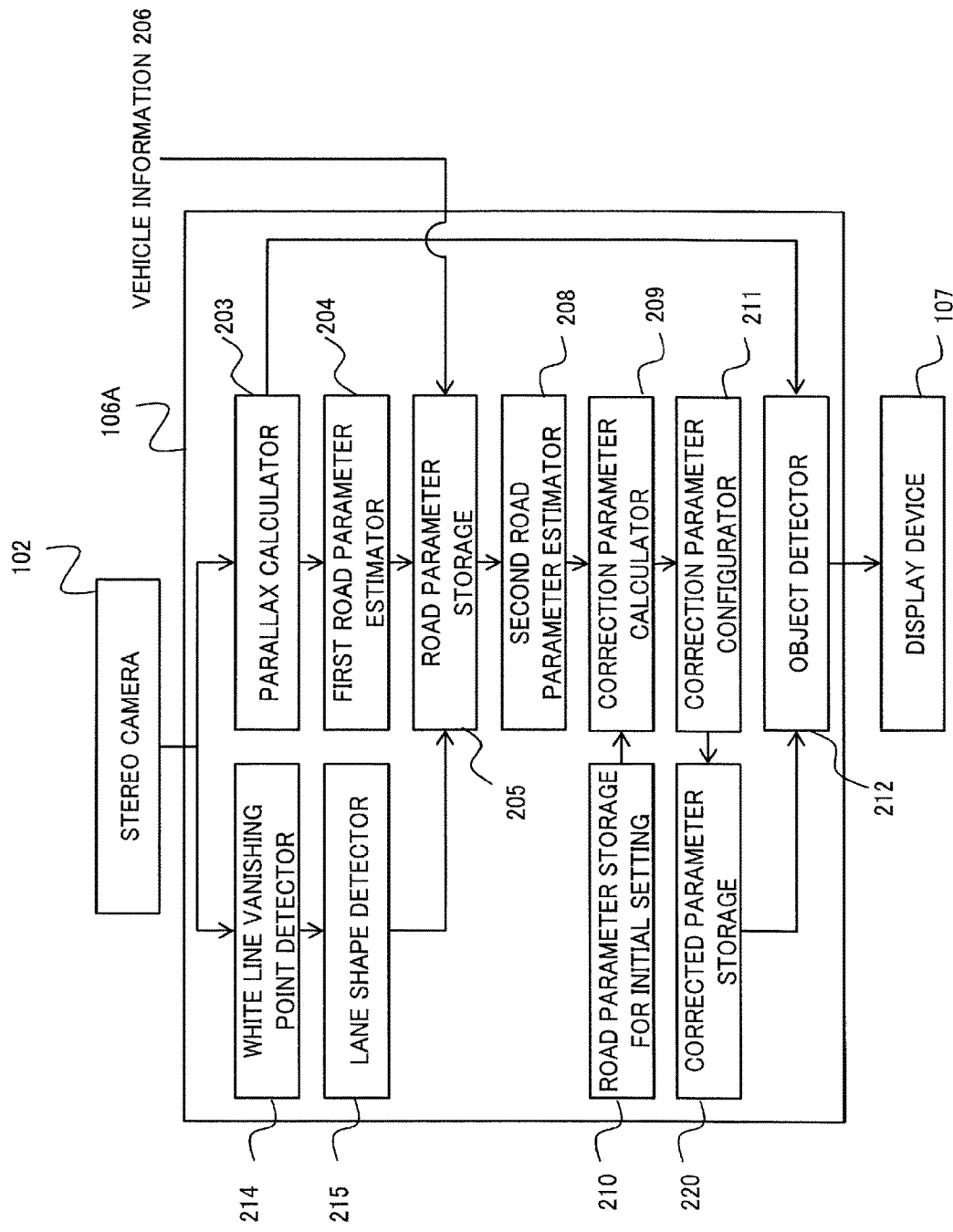
FIG. 12 is a block diagram showing a configuration of an object detection device according to a second embodiment.

FIG. 12 is a block diagram showing the configuration of the object detection device according to the present embodiment. An object detection device (calculation device 106A) according to the present embodiment includes a white line vanishing point detector 214 and a lane shape detector 215 as shown in FIG. 12, in addition to the same configuration (FIG. 2) as that in the first embodiment.

Based on the image shot by the stereo camera 102, the white line vanishing point detector 214 detects the left and right white lines drawn on the traveling lane of the road as a straight line (or a curve). The white line vanishing point detector 214 obtains an intersection point in the case of extending two detected straight lines (or curves) as a vanishing point.

Based on the detection result by the white line vanishing point detector 214, the lane shape detector 215 performs processing for estimating the shape of the lane from the position of the vanishing point of the obtained white line. For example, a point (vanishing point) where extensions of the left and right lanes intersect on the horizon is estimated to be observed more left than the initial position of traveling on a flat straight road if the road curves to the left, more right than the initial position if it curves to the right, upper than the initial position if the road is going uphill, and lower than the initial position if it is going downhill. For this reason, when the vanishing point is in a predetermined range close to the initial position, it can be determined that the road on which the vehicle is traveling has no change in slope and is not curved (is a straight road).

In the present embodiment, the road parameter storage 205 obtains the first road parameters obtained by the first road parameter estimator 204 in association with the vehicle information 206 such as the vehicle speed, the yaw rate, and the pitch rate and the lane shape obtained by the lane shape detector 215.

Also, using the information stored in the road parameter storage 205, the second road parameter estimator 208 more accurately extracts the first road parameter under the condition to be considered that there is no change in the slope and no curving, and more accurately calculates the second road parameter. The operation of each of the functional units described above will be described below.

Figure 13:
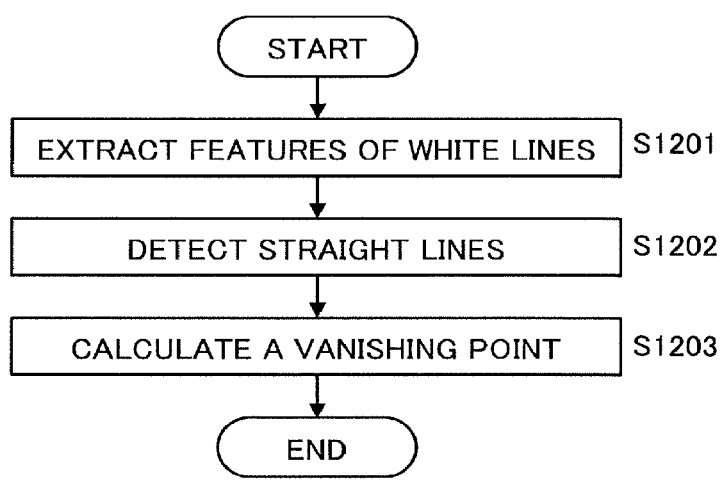
FIG. 13 is a flowchart showing processing in a white line vanishing point detector.

FIG. 13 is a flowchart showing processing in the white line vanishing point detector 214. The flowchart shown in FIG. 13 is performed, for example, in a predetermined cycle (for example, 1/30 seconds) by the calculation device 106A functioning as the white line vanishing point detector 214.

First, the white line vanishing point detector 214 extracts a white line portion from one or both camera images of the stereo camera 102, for example, as a feature point group based on a predetermined feature amount (S1201). The processing of step S1201 can be performed, for example, by performing image processing of vertical edge extraction and extracting as a white line a part where the edge strength is as strong as a predetermined value or more.

Next, the white line vanishing point detector 214 performs straight line extraction using the extracted feature point group of the white line part, thereby obtaining left and right white lines as straight lines (S1202). The processing of step S1202 can be performed, for example, by obtaining a straight line using the straight Hough transform described in Non-Patent Document 4.

Next, using the obtained two straight lines corresponding to the left and right white lines, the white line vanishing point detector 214 obtains as a vanishing point a point where the two straight lines intersect near the horizon (S1202). The white line vanishing point detector 214 outputs the information indicating the detection result of the vanishing point as described above to the lane shape detector 215, and ends the processing according to the flowchart.

Figure 14:
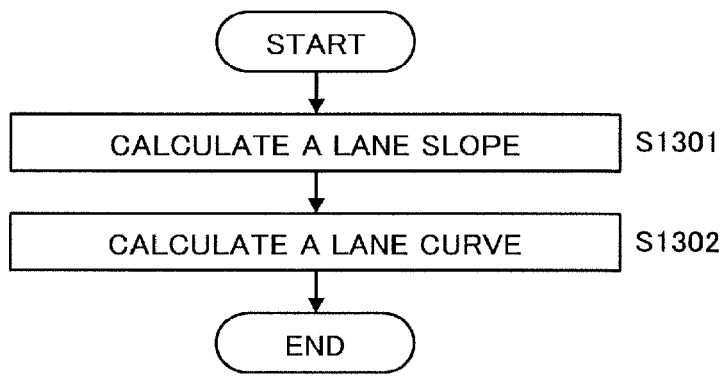
FIG. 14 is a flowchart showing processing in a lane shape detector.

FIG. 14 is a flowchart showing the processing in the lane shape detector 215. The flowchart shown in FIG. 14 is sequentially performed by the calculation device 106A functioning as the lane shape detector 215, for example, after the processing in the white line vanishing point detector 214.

First, based on the detection result by the white line vanishing point detector 214, the lane shape detector 215 calculates a lane slope and the like (S1301). From the viewpoint of the lane shape, the lane shape detector 215 determines whether the lane where the vehicle is currently traveling is an uphill road, a downhill road, or a road having no change in slope.

In the determination of step S1301, the position of the vanishing point observed while the vehicle is traveling on a road having no change in slope is set in advance as a reference standard position, and the calculated position of the vanishing point is compared with the standard position. The lane shape detector 215 determines that the current lane is an uphill road when the calculated position of the vanishing point is above the standard position, and that the current lane is a downhill road when the calculated position of the vanishing point is below the standard position.

Also, the lane shape detector 215 calculates a curve such as the curvature in the yaw direction of the lane (S1302), and, from the viewpoint of the lane shape, determines whether the lane where the vehicle is currently traveling is a left curve, a right curve, or a straight road.

In the determination of step S1302, it is determined that the lane where the vehicle is currently traveling curves to the left (or right) if the calculated position of the vanishing point shifts to the left (or right) from the standard position where the position of the vanishing point observed while traveling on a straight road is taken as a reference standard position. Furthermore, if the calculated position of the vanishing point falls within a predetermined range that is considered to be close to the standard position, the lane shape detector 215 determines that the lane where the vehicle is traveling is a road having no change in slope and is not curved.

The lane shape detector 215 outputs lane shape detection information including the above determination results to the road parameter storage 205, and ends the processing according to this flowchart.

The road parameter storage 205 stores the detection information of the lane shape by the lane shape detector 215 in association with the first road parameter and the vehicle information 206 obtained in synchronization.

Using the lane shape detection information together with the vehicle information 206, the second road parameter estimator 208 performs condition search of the first road parameter stored in the road parameter storage 205. For example, the second road parameter estimator 208 extracts a first road parameter in a case where the vehicle speed is 40 km/h or more, the yaw rate and the pitch rate are almost 0, and the lane shape obtained from the vanishing point does not have a change in slope and is a straight road. As a result, it is possible to more accurately obtain the first road parameter that is considered to have been calculated while the vehicle 101 is traveling straight on a road having no change in slope.

As described above, the object detection device (calculation device 106A) according to the present embodiment further includes the white line vanishing point detector 214 and the lane shape detector 215. Based on two white lines in the image, the white line vanishing point detector 214 detects a vanishing point, which is a point where the extension lines of the two white lines intersect. The lane shape detector 215 detects the change in slope of the road surface in the image based on the position of the vanishing point. The road parameter storage 205 associates and stores the detection result of the change in slope of the road surface by the lane shape detector 215 and the first road parameter. Based on the detection result of the change in slope of the road surface stored by the road parameter storage 205, the second road parameter estimator 208 calculates the second road parameter.

In the present embodiment, the lane shape detector 215 compares the position of the vanishing point detected by the white line vanishing point detector 214 with the position of the vanishing point when the vehicle is traveling on a straight road set in advance, and detects the shape of the lane.

According to the above object detection device, the lane shape detector 215 can detect a change in slope of the road while the vehicle is traveling, and the estimation accuracy of the road parameter when the vehicle 101 travels straight on the road surface having no change in slope can be improved.

Third Embodiment

In the first embodiment, the lane shape is detected from the image shot by the stereo camera. In the third embodiment, an object detection device that further recognizes a shooting environment with a stereo camera will be described.

Figure 15:
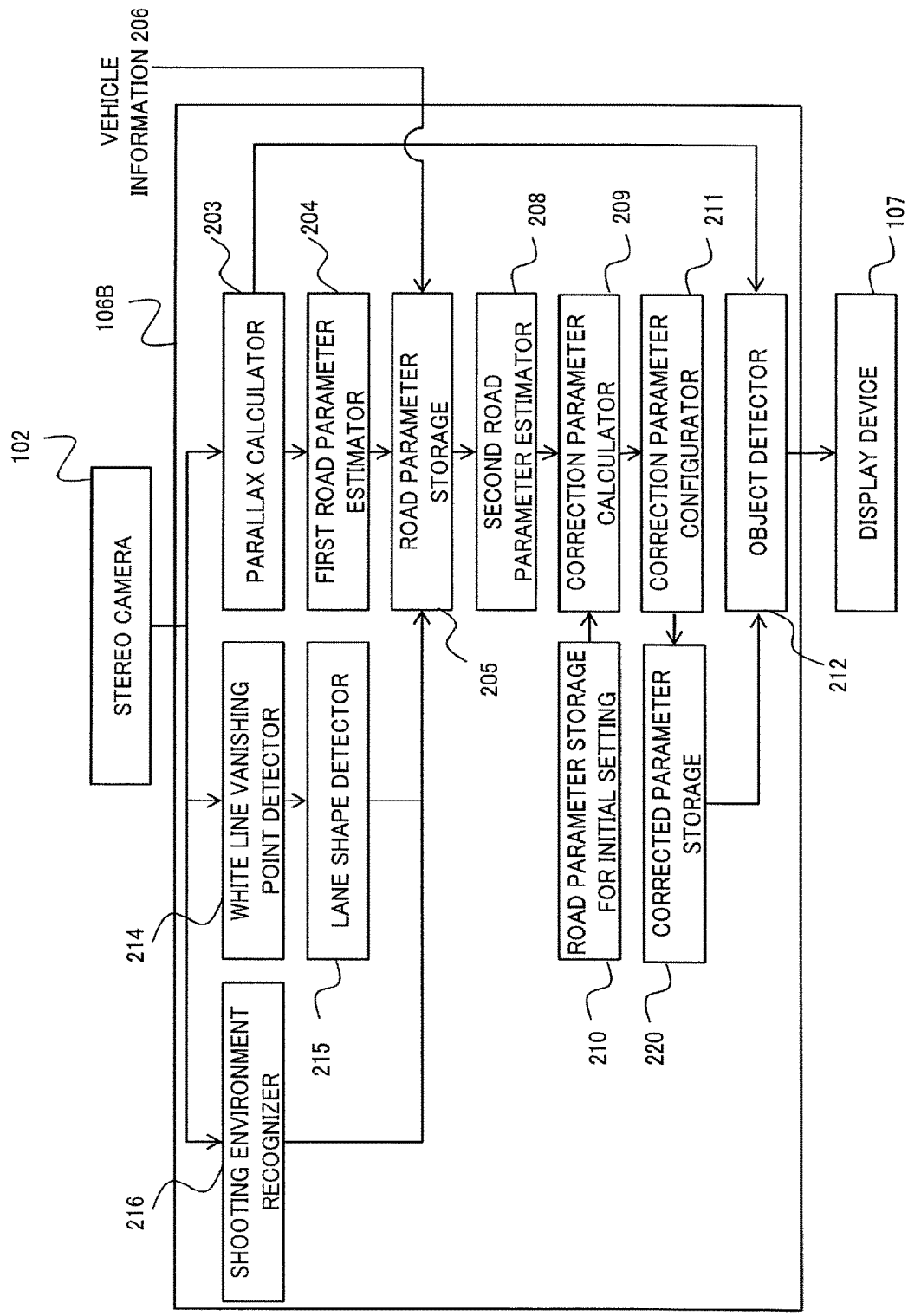
FIG. 15 is a block diagram showing a configuration of an object detection device according to a third embodiment.

FIG. 15 is a block diagram showing the configuration of an object detection device according to the present embodiment. An object detection device (calculation device 106B) according to the present embodiment includes a shooting environment recognizer 216 as shown in FIG. 15, in addition to the same configuration (FIG. 12) as that in the second embodiment.

The shooting environment recognizer 216 receives an image obtained from the stereo camera 102, and recognizes a shooting environment including a sunshine condition, a weather condition, and a condition related to the traveling road surface related to the currently traveling scene. The sunshine condition indicates, for example, one of day time, night time, sunset, and the like for the target scene. The weather condition indicates, for example, one of sunny, cloudy, rainy, snowy, and the like for the target scene. The condition related to the traveling road surface indicates one of a paved road, an unpaved road, and the like for the traveling road surface.

In the present embodiment, the road parameter storage 205 stores the first road parameter in association with information indicating the shooting environment recognized by the shooting environment recognizer 216 together the vehicle information 206 and lane shape detection information.

Using the information stored in the road parameter storage 205, the second road parameter estimator 208 extracts the first road parameter under the condition to be considered that the road surface on which the vehicle 101 is traveling does not have a change in slope and is not curving, and that the recognition accuracy is high from the viewpoint of the shooting environment. The operation of each of the functional units described above will be described below.

Figure 16:
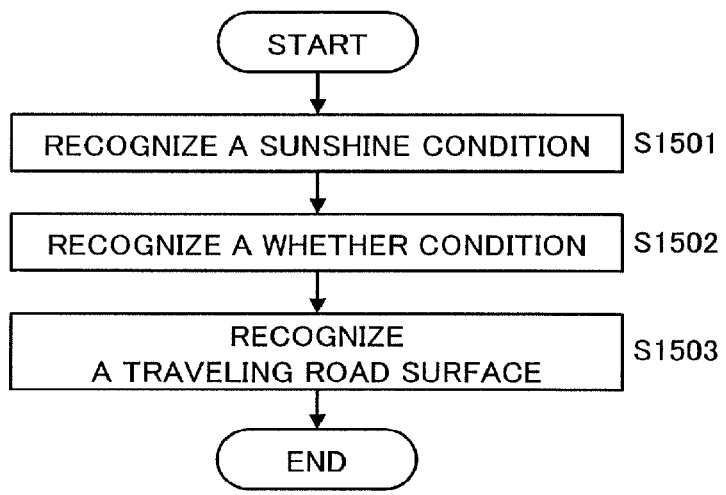
FIG. 16 is a flowchart showing processing in a shooting environment recognizer.

FIG. 16 is a flowchart showing the processing in the shooting environment recognizer 216. The flowchart shown in FIG. 16 is performed, for example, in a predetermined cycle (for example, 1/30 seconds) by the calculation device 106B functioning as the shooting environment recognizer 216.

In the flowchart of FIG. 16, the shooting environment recognizer 216 recognizes the sunshine condition based on the image input from the stereo camera 102 (S1501). In step S1501, the shooting environment recognizer 216 recognizes the brightness of the scene based on the average brightness of the input image, the exposure time at the time when the camera is imaging, and the gain value at the time when the camera is imaging, and calculates the intensity of the sunshine condition.

Also, the shooting environment recognizer 216 recognizes the weather condition based on the input image (S1502). In step S1502, the shooting environment recognizer 216 performs texture analysis of the part of the input image where the sky appears (for example, presence or absence of a cloud) and sharpness analysis of the edge of other parts (that is, presence or absence of image blurring caused by water drops on the lens and presence or absence of the image unsharpened due to rainfall or snowfall), and thus recognizes the weather condition.

The shooting environment recognizer 216 recognizes the condition related to the traveling road surface based on the input image (S1503). In step S1502, the shooting environment recognizer 216 performs determination of the presence or absence of a white line in the input image and edge amount analysis on the traveling road surface (that is, determination as to whether it is asphalt or non-paved road), and thus recognizes the state of the traveling road surface.

The shooting environment recognizer 216 outputs information indicating the recognition result of the shooting environment as described above to the road parameter storage 205, and ends the processing according to this flowchart.

According to the above process, the road parameter storage 205 stores therein information indicating the recognition result of the shooting environment together with the vehicle information 206 and lane shape detection information, and the second road parameter estimator 208 uses the information to perform condition search of the first road parameter. For example, in addition to the conditions similar to those in the second embodiment, the second road parameter estimator 208 extracts the first road parameter under conditions in which the sunshine condition is "daytime", the weather condition is "cloudy", and the condition related to the traveling road surface is a paved road. This allows the second road parameter based on the extracted first road parameter to be more accurately obtained.

As described above, the object detection device (calculation device 106B) according to the present embodiment further includes the shooting environment recognizer 216 that recognizes the shooting environment of the image obtained from the stereo camera 102. The road parameter storage 205 associates and stores information indicating the shooting environment recognized by the shooting environment recognizer 216 with the first road parameter. Based on information indicating the shooting environment stored in the road parameter storage 205, the second road parameter estimator 208 calculates a second road parameter.

In the present embodiment, the information indicating the shooting environment includes information indicating at least one of the sunshine condition, the weather condition, and the condition related to the traveling road surface of the vehicle.

According to the above object detection device, the estimation accuracy of the positional shift can be improved by the second road parameter estimator 208 calculating the second road parameter without using the first road parameter assumed to be highly likely to have the image recognition accuracy reduced from the viewpoint of the shooting environment.

Fourth Embodiment

In the fourth embodiment, the update timing of the correction result by the second road parameter will be described.

Figure 17:
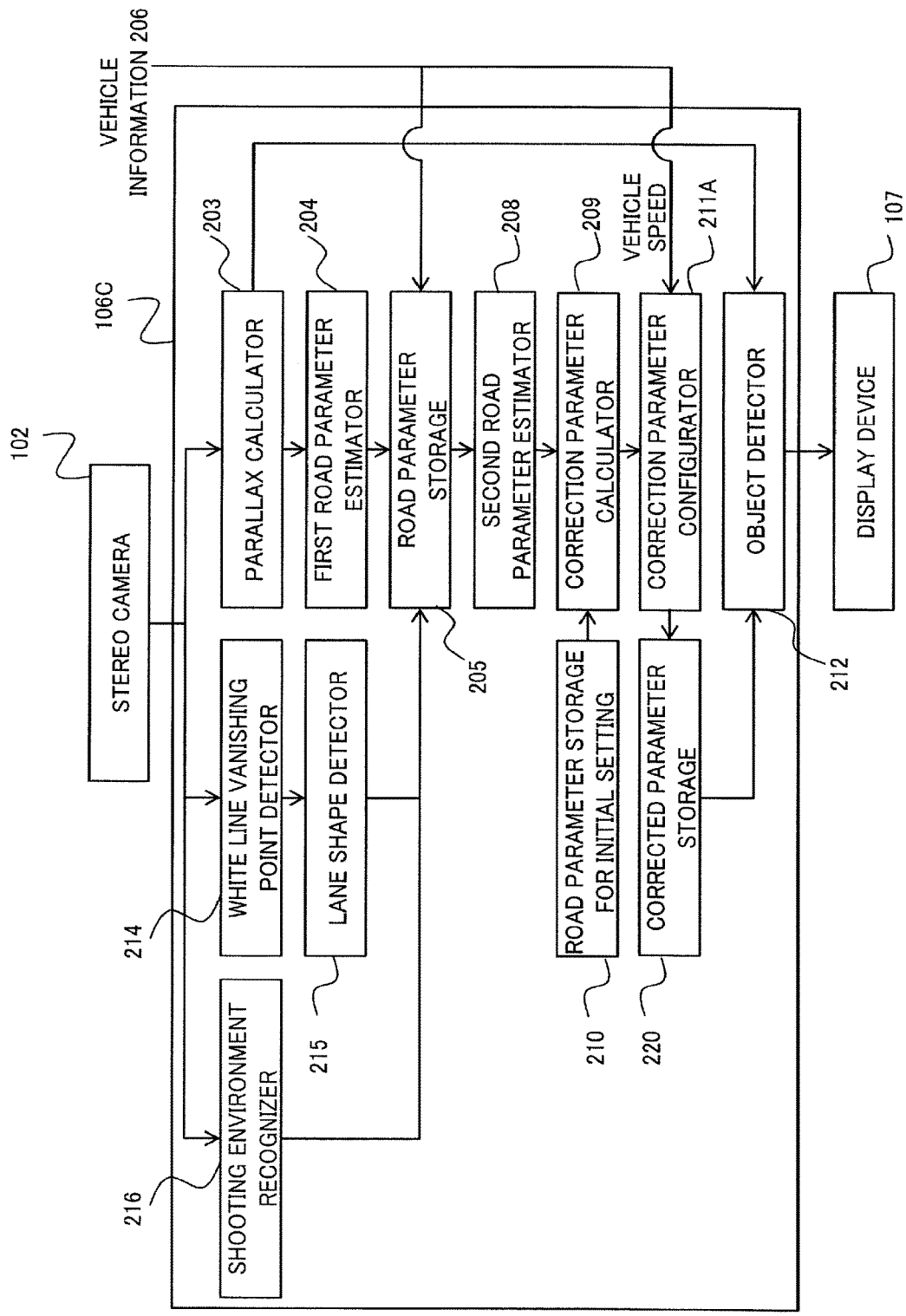
FIG. 17 is a block diagram showing a configuration of an object detection device according to a fourth embodiment.

FIG. 17 is a block diagram showing the configuration of the object detection device according to the present embodiment. The object detection device (calculation device 106C) according to the present embodiment inputs the vehicle information 206 to a correction parameter configurator 211A as shown in FIG. 17 in the same configuration (FIG. 15) as in the third embodiment.

As in the first embodiment, the correction parameter configurator 211A writes in the corrected parameter storage 220 the baseline length calculated by the correction parameter calculator 209 in order to update the baseline length D used when calculating the three-dimensional position from the parallax d. In the present embodiment, the correction parameter configurator 211A uses the information of the vehicle speed in the vehicle information 206 of the vehicle 101 to limit the update timing of writing the baseline length in the corrected parameter storage 220 to the time when the vehicle 101 is stopped.

As described above, in the present embodiment, based on the information indicating the vehicle speed of the vehicle 101, the correction parameter configurator 211A reflects the correction result of the camera parameter when the vehicle 101 is stopped.

When the correction result is reflected by the correction parameter configurator 211A, the distance to the object detected by the object detector 212 based on the image obtained from the stereo camera 102 changes. From this, in the application using the position information of the detected object, if the distance to the object changes while controlling the vehicle 101, a mistake in controlling may be made or unreasonable control may be performed under the influence of the change. On the other hand, in the present embodiment, the safety can be improved by reflecting the correction parameter when the vehicle 101 is stopped, which is a timing that does not affect the application.

OTHER EMBODIMENTS

Although in the description of the above embodiments, three-dimensional information is measured based on the parallel stereo method, not only the parallel stereo method but also various other measurement methods may be adopted. In this case, correction is performed in accordance with the measurement method adopted in step S301 of FIG. 4, for example.

In the above embodiments, the object detection device detects the object using the stereo camera 102 mounted on the vehicle 101. The vehicle includes various movable bodies that travel on the road surface, such as automobiles, motorcycles, and railway cars.

As mentioned above, although specific embodiments of the present invention has been described, the present invention is not limited to those forms, and various changes can be made and implemented within the range of the present invention. For example, an appropriate combination of the contents of the individual embodiments described above may be used as an embodiment of the present invention.

The invention claimed is:

1. An object detection device that detects an object based on an image obtained from a stereo camera on a vehicle, the object detection device comprising circuitry configured to operate as:
    a parallax calculator that calculates three-dimensional information of a scene in the image;
    a first road parameter estimator that calculates, based on the three-dimensional information, a first road parameter indicating a distance between the stereo camera and a road surface on which the vehicle is traveling;
    a road parameter storage that associates the first road parameter with vehicle information related to a traveling state of the vehicle successively to store a plurality of first road parameters and associated vehicle information;
    a second road parameter estimator that calculates, based on the plurality of first road parameters and associated vehicle information stored in the road parameter storage, a second road parameter using the first road parameter in the plurality of first road parameters having the associated vehicle information that corresponds to a predetermined condition related to the vehicle; and
    an object detector that detects the object using the second road parameter, wherein the predetermined condition includes a condition that an angular difference between the road surface observed from the stereo camera and a contact surface of the vehicle at a time of observation is within a predetermined angle indicating that the road surface and the contact surface of the vehicle are regarded as parallel with each other,
    wherein based on conditional search of the associated vehicle information to require that the angular difference is within the predetermined angle, the second road parameter estimator extracts a first road parameter meeting the predetermined condition from the plurality of first road parameters stored in the road parameter storage, to calculate the second road parameter based on the extracted first road parameter.

2. The object detection device according to claim 1, wherein
    the second road parameter estimator
    extracts a set of first road parameters each meeting the predetermined condition from the plurality of first road parameters stored in the road parameter storage, based on the conditional search, and
    calculates the second road parameter as a statistical processed value on the extracted first road parameters.

3. The object detection device according to claim 1, wherein the predetermined condition includes a condition that the road surface observed from the stereo camera and the contact surface of the vehicle at the time of observation are on a same plane without slope variation.

4. The object detection device according to claim 1, wherein the vehicle information includes information indicating at least one of a vehicle speed, a yaw rate, a pitch rate, a roll rate, a steering angle, and an inclination angle of the vehicle.

5. The object detection device according to claim 4, wherein
    the predetermined condition includes at least one of:
    a condition that the yaw rate, the pitch rate, or the roll rate in the vehicle information is a value within a predetermined range corresponding to a state where the vehicle travels on a straight road;
    a condition that a steering angle in the vehicle information is a value within a predetermined range corresponding to a steering when the vehicle is traveling straight; and
    a condition that an inclination angle in the vehicle information is a value within a predetermined range corresponding to a state where the vehicle travels on a horizontal road surface.

6. The object detection device according to claim 1, further comprising:
    a white line vanishing point detector that detects a vanishing point based on two white lines in the image, the vanishing point being a point where extension lines of the two white lines intersect; and
    a lane shape detector that detects slope variation of a road surface in the image based on a position of the vanishing point, wherein
    the road parameter storage associates a detection result with the first road parameter to store therein, the detection result indicating the slope variation of the slope variation of the road surface detected by the lane shape detector, and
    the second road parameter estimator calculates the second road parameter based on the detection result of the slope variation of the road surface stored in the road parameter storage.

7. The object detection device according to claim 6, wherein the lane shape detector detects the lane shape by comparing the position of the vanishing point detected by the white line vanishing point detector with a position of the vanishing point set in advance when the vehicle travels a straight road.

8. The object detection device according to claim 1, further comprising a shooting environment recognizer that recognizes a shooting environment of an image obtained from the stereo camera, wherein
    the road parameter storage associates information indicating a shooting environment recognized by the shooting environment recognizer with the first road parameter to store therein, and
    the second road parameter estimator calculates the second road parameter based on information indicating the capturing environment stored in the road parameter storage.

9. The object detection device according to claim 8, wherein the information indicating the capturing environment includes information indicating at least one of a sunshine condition, a weather condition, and a condition related to a traveling road surface of the vehicle.

10. The object detection device according to claim 1, further comprising:
a correction parameter calculator that calculates a correction parameter in accordance with a shift amount of the stereo camera by comparing the second road parameter with a preset reference road parameter; and
a correction parameter configurator that corrects a camera parameter related to the stereo camera based on the correction parameter, wherein
the object detector detects a position of the object using a camera parameter corrected by the correction parameter configurator.

11. The object detection device according to claim 10, wherein the correction parameter configurator reflects a correction result of the camera parameter when the vehicle is stopped, based on information indicating a vehicle speed of the vehicle.

12. The object detection device according to claim 1, wherein the first road parameter estimator calculates the first road parameter that indicates the distance between the stereo camera and the road surface on which the vehicle is traveling as a length of a perpendicular drawn from a projection center of the stereo camera to the road surface.

13. The object detection device according to claim 1, further comprising:
a detector that detects a change in slope of the road surface on which the vehicle is traveling; and
the second road parameter estimator calculates the second road parameter based on the detected slope change in the slope of the road surface on which the vehicle is traveling.

14. A vehicle comprising:
a stereo camera that shoots an image;
a vehicle information detector that detects vehicle information; and
an object detection device that detects an object based on the image obtained from the stereo camera, the object detection device including circuitry configured to operate as
a parallax calculator that calculates three-dimensional information of a scene in the image;
a first road parameter estimator that calculates, based on the three-dimensional information, a first road parameter indicating a distance between the stereo camera and a road surface on which the vehicle is traveling;
a road parameter storage that associates the first road parameter with the vehicle information related to a traveling state of the vehicle successively to store a plurality of first road parameters and associated vehicle information;
a second road parameter estimator that calculates, based on the plurality of first road parameters and associated vehicle information stored in the road parameter storage, a second road parameter using the first road parameter in the plurality of first road parameters having the associated vehicle information that corresponds to a predetermined condition related to the vehicle; and
an object detector that detects the object using the second road parameter, wherein
the predetermined condition includes a condition that an angular difference between the road surface observed from the stereo camera and a contact surface of the vehicle at a time of observation is within a predetermined angle indicating that the road surface and the contact surface of the vehicle are regarded as parallel with each other,
wherein based on conditional search of the associated vehicle information to require that the angular difference is within the predetermined angle, the second road parameter estimator extracts a first road parameter meeting the predetermined condition from the plurality of first road parameters stored in the road parameter storage, to calculate the second road parameter based on the extracted first road parameter.

15. A method of operating an object detection device that detects an object based on an image obtained from a stereo camera on a vehicle, the method comprising:
calculating a three-dimensional information of a scene in the image;
calculating, based on the three-dimensional information, a first road parameter indicating a distance between the stereo camera and a road surface on which the vehicle is traveling;
associating the first road parameter with vehicle information related to a traveling state of the vehicle;
successively storing a plurality of first road parameters and associated vehicle information:
calculating, based on the stored plurality of first road parameters and associated vehicle information, a second road parameter using the first road parameter in the plurality of first road parameters having the associated vehicle information that corresponds to a predetermined condition related to the vehicle; and
detecting the object using the second road parameter, wherein
the predetermined condition includes a condition that an angular difference between the road surface observed from the stereo camera and a contact surface of the vehicle at a time of observation is within a predetermined angle indicating that the road surface and the contact surface of the vehicle are regarded as parallel with each other,
wherein the second road parameter is calculated by extracting a first road parameter meeting the predetermined condition from the plurality of first road parameters stored in the road parameter storage, based on conditional search of the associated vehicle information to require that the angular difference is within the predetermined angle.

* * * * *